United States Patent
Biagini et al.

(10) Patent No.: US 12,234,320 B2
(45) Date of Patent: Feb. 25, 2025

(54) PROCESS FOR PREPARING POLYCARBONATE AND CATALYTIC SYSTEM USED

(71) Applicant: ENI S.P.A., Rome (IT)

(72) Inventors: Paolo Biagini, Novara (IT); Riccardo Po, Novara (IT); Laura Boggioni, Abbiategrasso (IT); Lorenzo Veronese, Cechov (IT)

(73) Assignee: ENI S.P.A., Rome (IT)

( * ) Notice: Subject to any disclaimer, the term of this patent is extended or adjusted under 35 U.S.C. 154(b) by 831 days.

(21) Appl. No.: 17/286,290

(22) PCT Filed: Oct. 15, 2019

(86) PCT No.: PCT/IB2019/058758
§ 371 (c)(1),
(2) Date: Apr. 16, 2021

(87) PCT Pub. No.: WO2020/079573
PCT Pub. Date: Apr. 23, 2020

(65) Prior Publication Data
US 2021/0355274 A1 Nov. 18, 2021

(30) Foreign Application Priority Data
Oct. 16, 2018 (IT) .................... 102018000009498

(51) Int. Cl.
| | | |
|---|---|---|
| C08G 64/34 | (2006.01) |
| B01J 31/02 | (2006.01) |
| B01J 31/22 | (2006.01) |
| B01J 31/34 | (2006.01) |
| C07F 11/00 | (2006.01) |
| C08G 64/02 | (2006.01) |
| C08L 69/00 | (2006.01) |

(52) U.S. Cl.
CPC .......... *C08G 64/34* (2013.01); *B01J 31/0268* (2013.01); *B01J 31/2243* (2013.01); *B01J 31/34* (2013.01); *C07F 11/005* (2013.01); *C08G 64/0208* (2013.01); *C08L 69/00* (2013.01)

(58) Field of Classification Search
CPC ...... C08G 64/34; C08G 64/32; B01J 31/0268; B01J 31/2243; B01J 31/34
See application file for complete search history.

(56) References Cited

U.S. PATENT DOCUMENTS 6,870,004 B1    3/2005  Nguyen
2006/0089252 A1* 4/2006 Coates .................. C07F 15/065
                                                    502/150

FOREIGN PATENT DOCUMENTS

WO    WO-2010147237 A1 * 12/2010  ............. C08G 64/34

OTHER PUBLICATIONS

Coates et al. Exploration of Cocatalyst Effects on a Bimetallic Cobalt Catalyst System: Enhanced Activity and Enantioselectivity in Epoxide Polymerization, Macromolecules 2011, 44, 5666-5670. (Year: 2011).*
C. Cohen, G. Coates, Journal of Polymer Science: Part A: Polymer Chemistry 2006, vol. 44, 5182-5191 (Year: 2006).*
W. Hirahata, R. Thomas, E. Lobkovsky, G. Coates, J. Am. Chem. Soc. 2008, 130, 17658-17659. (Year: 2008).*
International Search Report dated Nov. 14, 2019 for PCT application No. PCT/IB2019/058758.
Written Opinion dated Nov. 14, 2019 for PCT application No. PCT/IB2019/058758.
Rao et al; "Binding of 4-(N, N-dimethylamino) Pyridine to Salen- and Salen-Cr (III) Cations: A Mechanistic Understanding on the Difference in Their Catalytic Activity for C0 2 /Epoxide Copolymerization"; Inorganic Chemistry, vol. 48, No. 7; Apr. 6, 2009; pp. 2830-2836.
Li et al; "Asymmetric, Regio-and Stereo-Selective Alternating Copolymerization of C0 2 and Propylene Oxide Catalyzed by Chiral Chromium Salan Complexes"; Journal of Polymer Science, Part A, Polymer Chemistry, vol., No. 18; Sep. 15, 2009; pp. 6102-6113.

* cited by examiner

*Primary Examiner* — David J Buttner
*Assistant Examiner* — Surbhi M Du
(74) *Attorney, Agent, or Firm* — Ruggiero McAllister & McMahon LLC

(57) ABSTRACT

There is a process for preparing polycarbonate. The process has the step of copolymerizing an epoxy compound and carbon dioxide ($CO_2$) in the presence of a catalytic system having at least one catalyst selected from complexes of a transition metal having general formula (I):

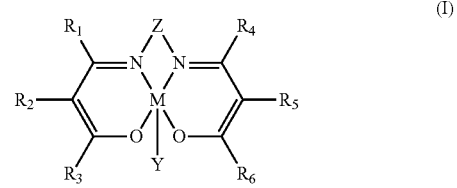

The aforesaid process allows to obtain polycarbonates having a quantity of carbonate bonds in chain greater than 95% or polycarbonate/polyether copolymers having a quantity of ether bonds in chain ranging from 15% to 90%.

12 Claims, No Drawings

PROCESS FOR PREPARING POLYCARBONATE AND CATALYTIC SYSTEM USED

CROSS-REFERENCE TO A RELATED APPLICATION

The present application claims priority based on PCT Application No. PCT/IB2019/058758, filed Oct. 15, 2019, which claims priority based on Italy Patent Application No. 102018000009498, filed Oct. 16, 2018, the contents of both of which are incorporated herein be reference in their entireties.

FIELD OF THE DISCLOSURE

The present disclosure relates to a process for preparing polycarbonate. More in particular, the present disclosure relates to a process for preparing polycarbonate comprising copolymerizing an epoxy compound and carbon dioxide ($CO_2$) in the presence of a catalytic system comprising: at least one catalyst selected from complexes of a transition metal; at least one co-catalyst selected from ionic compounds.

DESCRIPTION OF THE RELATED ART

It is known that aliphatic polycarbonates are biodegradable polymers mainly used in multi-layer compositions for barrier films, as thickeners in the formulation of inks and in the production of gifts and fancy goods. Their interest at industrial level also derives from the fact that aliphatic polycarbonates may be produced without the use of hazardous reagents such as, for example, phosgene, through a process that involves the copolymerization of an epoxy compound and carbon dioxide ($CO_2$): said process is therefore "eco-friendly" and has greater development prospects especially due to the use of carbon dioxide ($CO_2$) which is considered an easily obtainable and low cost compound.

Since the 1960s many researchers have developed various types of catalytic systems suitable for preparing polycarbonates by alternate copolymerization between an epoxy compound and carbon dioxide ($CO_2$).

For example, Inoue S. et al, in "*Journal of Polymer Science Part C: Polymer Letters*" (1969), Vol. 7, Issue 4, pag. 287-292, describe the use of a heterogeneous catalytic system, insufficiently characterized and obtained by partial hydrolysis of diethylzinc ($ZnEt_2$), in the copolymerization of an epoxy compound and carbon dioxide ($CO_2$). However, the catalyst so obtained has very low activity, requiring a few days to produce significant amounts of polycarbonate.

Aida T. et al, in "*Journal of American Chemical Society*" (1983), Vol. 105, pag. 1304-1309, describe the use of aluminum porphyrins for the purpose of activating the carbon dioxide ($CO_2$) which is subsequently reacted with an epoxy compound. Also in this case, the catalytic activity is insufficient (<0.3 turnovers/h).

Darensbourg D. J. et al, in "*Macromolecules*" (1995), Vol. 28, pag. 7577-7579, describe the use of some hindered zinc(II) phenoxides in the copolymerization of an epoxy compound and carbon dioxide ($CO_2$), obtaining catalytic activity up to 2.4 turnovers/h.

Over the years, some researchers have proposed the use of catalytic systems based on transition metals and, in particular, the use of chromium(III) or cobalt(III) complexes.

For example, Holmes A. B. et al, in "*Macromolecules*" (2000), Vol. 33(2), pag. 303-308, describe the use of particular chromium(III) porphyrins in the copolymerization of an epoxy compound and carbon dioxide ($CO_2$). In particular, they describe the production of polycarbonates, in particular poly(cyclohexene carbonates) with considerable yields variable around 50% -70% and having not very high molecular weights [i.e. having a number average molecular weight ($M_n$) ranging from 1500 to 3900].

Chen X. et al, in "*Polymer*" (2009), Vol. 50, pag. 441-446, describe the use of a series of chromium(III) complexes/ Schiff base N,N'-bis(salicylidene)-1,2-phenyldiamine chromium(III) halides (e.g., [Cr(Salen)Cl]) for producing polypropylene carbonate, with not very high yields (<50%) and unsatisfactory selectivity towards the formation of polypropylene oxide and/or cyclic carbonate, but with interesting molecular weights (number average molecular weight $M_n$ up to 25000). Similar results were obtained by Lu X. et al, in "*Science China Chemistry*" (2010), Vol. 53, pag. 1646-1652, who describe the use of complexes based on Co(Salen)Cl for the purpose of producing polypropylene carbonate with yields around 50% and variable molecular weights (number average molecular weights $M_n$ ranging from 6500 to 30000).

Pescarmona P. P. et al, in the review "*Journal of Applied Polymer Science*" (2014), DOI: 10.1002/APP.41141, effectively describe all the aspects inherent to the reaction between epoxides and carbon dioxide ($CO_2$) reporting the chemical/physical characterization of the polymers obtained and their current potential field of application.

From careful reading of the prior art in relation to the use of catalytic systems based on transition metals for producing polycarbonates it may be deduced that the transition metal complexes proposed as catalysts are activated through the addition of particular co-catalysts that are generally comprised of strong bases such as organic Lewis bases, or organic ionic species such as quaternary ammonium salts or compounds such as bis(triphenylphosphoranylidene)ammonium chloride (PPNCl) having formula (Ia):

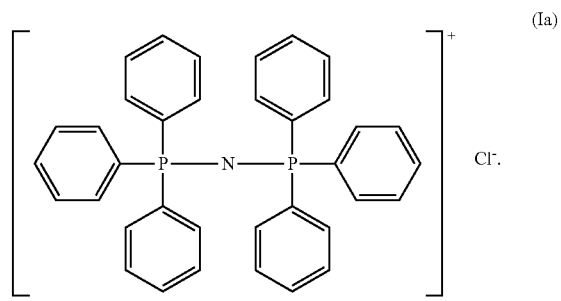

Often the nature of the co-catalyst and the molar ratio with the transition metal complex used, dramatically change the yield and the selectivity of the copolymerization reaction between the epoxy compound and carbon dioxide ($CO_2$), as well as the characteristics of the polycarbonate obtained.

For example, Darensbourg D. et al, in "*Organometallics*" (2005), Vol. 24(1), pag. 144-148, describe the use of different co-catalysts, for example, bis(triphenylphosphoranylidene)ammonium azide ([PPN][$N_3$]), in the presence of catalysts selected from chromium/salen complexes, in the copolymerization of cyclohexene oxide and carbon dioxide ($CO_2$): then their behavior is studied and an activation mechanism is proposed.

Lu X. B. et al, in "*Journal of the American Chemical Society*" (2006), Vol. 128(5), pag. 1664-1674, describe the use of different co-catalysts such as organic ionic ammonium salts or strong organic bases based on sterically hindered amines in the presence of cobalt complexes such as Co(Salen)Cl, in the copolymerization of an epoxy compound and carbon dioxide ($CO_2$): then the selectivity in the production of the polymer, enantioselectivity and stereochemical control are studied.

From the above, the importance of the role of the co-catalyst in the production of polycarbonate is therefore clear for the purpose of having an efficient catalytic system in terms of activity and selectivity, as well as the determination of the final properties of the polycarbonate obtained.

Since, as mentioned above, the process for obtaining polycarbonate which provides the copolymerization of an epoxy compound and carbon dioxide ($CO_2$) is "eco-friendly" and of interest especially because of the use of carbon dioxide ($CO_2$) which is considered an easily obtainable and low cost component, the study of new processes for obtaining polycarbonate which provides the copolymerization of an epoxy compound and carbon dioxide ($CO_2$) is still of great interest.

SUMMARY OF THE DISCLOSURE

The Applicant therefore set out to solve the problem of finding a new process for obtaining polycarbonate through the copolymerization of an epoxy compound and carbon dioxide ($CO_2$).

The Applicant has now found a process for preparing polycarbonate comprising copolymerizing an epoxy compound and carbon dioxide ($CO_2$) in the presence of a catalytic system comprising: at least one catalyst selected from complexes of a transition metal; at least one co-catalyst selected from ionic compounds. Said catalytic system, as well as having good performance levels in terms of activity and selectivity, allows the properties of the polycarbonate to be modulated according to the final use, in particular, in terms of molecular weight [i.e. weight average molecular weight ($M_w$) and number average molecular weight ($M_n$)], and polydispersion index (PDI) corresponding to the ratio between the weight average molecular weight ($M_w$) and the number average molecular weight ($M_n$) (i.e. to the ratio $M_w/M_n$). Furthermore, said catalytic system allows polycarbonates to be obtained having a quantity of carbonate bonds in chain greater than 95%, preferably greater than 99%, even more preferably equal to 100%, or polycarbonate/polyether copolymers having a quantity of ether bonds in chain ranging from 15% to 90%, preferably ranging from 35% to 85%.

The subject matter of the present disclosure is therefore a process for preparing polycarbonate comprising copolymerizing an epoxy compound and carbon dioxide ($CO_2$) in the presence of a catalytic system comprising:
at least one catalyst selected from complexes of a transition metal having general formula (I):

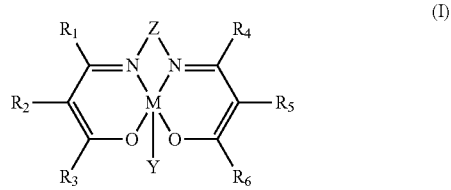

wherein:
M represents a metal atom selected from chromium, manganese, iron, cobalt, nickel, aluminum, preferably chromium, cobalt;

$R_1$, $R_2$, $R_3$, $R_4$, $R_5$ and $R_6$, mutually identical or different, represent a hydrogen atom; or they are selected from linear or branched, saturated or unsaturated, $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups;

or $R_2$ and $R_3$ and/or $R_5$ and $R_6$, may be linked together to form, together with the other atoms to which they are linked, a saturated, unsaturated or aromatic cycle containing from 2 to 12 carbon atoms, which may be optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

Y represents a halogen anion such as, for example, a fluoride anion, a chloride anion, a bromide anion, an iodide anion, preferably a chloride anion, a bromide anion; or it is selected from inorganic anions such as, for example, azide anion, hydroxide anion, amide anion, perchlorate anion, chlorate anion, sulfate anion, phosphate anion, nitrate anion, preferably an azide anion; or it is selected from organic anions such as, for example, $C_1$-$C_{20}$ alcoholate anion, $C_1$-$C_{20}$ thioalcoholate anion, $C_1$-$C_{30}$ carboxylate anion, $C_1$-$C_{30}$ alkyl- or dialkyl-amide anion;

Z represents a divalent organic radical having general formula (II), (III) or (IV):

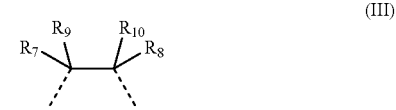

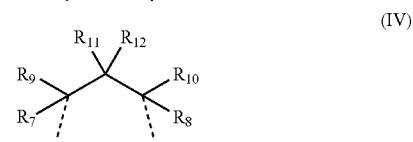

wherein:
$R_7$, $R_8$, $R_9$, $R_{10}$, $R_{11}$ and $R_{12}$, mutually identical or different, represent a hydrogen atom; or they are selected from linear or branched, saturated or unsaturated, $C_1$-$C_{20}$ alkyl groups, preferably $C_1$-$C_{12}$, optionally containing heteroatoms; optionally substituted aryl groups; optionally substituted heteroaryl groups;

optionally substituted cycloalkyl groups; optionally substituted heterocyclic groups;

or $R_7$ and $R_8$ in the general formula (II), or $R_8$ and $R_9$ or $R_9$ and $R_{10}$ in the general formula (III), or $R_7$ and $R_{11}$ or $R_7$ and $R_{12}$ or $R_{10}$ and $R_{12}$ or $R_{11}$ and $R_{10}$ in the general formula (IV), may be optionally linked to each other so as to form, together with the other atoms to which they are linked, a saturated, unsaturated, or aromatic, cycle containing from 2 to 12 carbon atoms, optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amino groups, dialkyl groups or diaryl-phosphine, linear or branched, saturated or unsaturated, $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

at least one co-catalyst selected from ionic compounds having general formula (V):

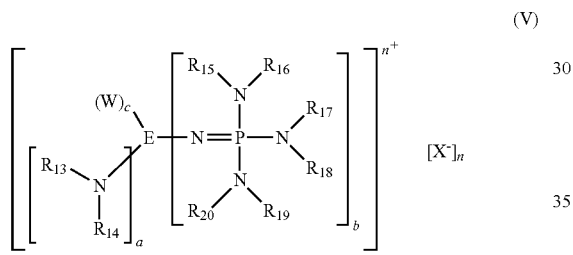

(V)

wherein:

E represents an atom selected from phosphorus, arsenic, antimony, bismuth, preferably phosphorus;

$R_{13}$, $R_{14}$, $R_{15}$, $R_{16}$, $R_{17}$, $R_{18}$, $R_{19}$ and $R_{20}$, mutually identical or different, represent a hydrogen atom; or they are selected from saturated or unsaturated, $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in cationic form, optionally substituted cycloalkyl groups, optionally substituted heterocyclic groups, said optionally substituted heterocyclic groups being optionally in cationic form, trialkyl- or triaryl-silyl groups;

or $R_{13}$ and $R_{14}$, and/or $R_{15}$ and $R_{16}$, and/or $R_{16}$ and $R_{17}$ and/or $R_{17}$ and $R_{18}$, and/or $R_{19}$ and $R_{20}$, may be optionally linked together so as to form, together with the other atoms to which they are linked, a saturated, unsaturated, or aromatic cycle containing from 2 to 12 carbon atoms, optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amino groups, dialkyl- or diaryl-phosphino groups, linear or branched, saturated or unsaturated, $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

W represents a halogen atom such as, for example, chlorine, bromine, fluorine, iodine, preferably chlorine, bromine; or it is selected from linear or branched, saturated or unsaturated, $C_1$-$C_{20}$ alkoxy groups, preferably $C_2$-$C_{10}$, optionally substituted aryloxy groups, oxylamine groups;

$X^-$ represents a halide anion such as, for example, a fluoride anion, a chloride anion, a bromide anion, an iodide anion, preferably a chloride anion, a bromide anion; or it is selected from inorganic anions such as, for example, azide anion, perchlorate anion, chlorate anion, sulfate anion, phosphate anion, nitrate anion, hexafluorophosphate anion, tetrafluoroborate anion; or it is selected from organic anions such as, for example, benzenesulfonate anion, toluenesulphonate anion, dodecyl sulfate anion, octylphosphate anion, dodecylphosphate anion, octadecylphosphate anion, phenylphosphate anion; or it is selected from tetraalkylborate anions optionally containing heteroatoms such as, for example, oxygen, sulfur, nitrogen, silicon, phosphorus, selenium, preferably oxygen, nitrogen; tetraarylborate anions optionally containing heteroatoms such as, for example, oxygen, sulfur, nitrogen, silicon, phosphorus, selenium, preferably oxygen, nitrogen; preferably a chloride anion, an azide anion;

a is an integer ranging from 0 to 4, preferably ranging from 1 to 3;

b is an integer ranging from 0 to 4, preferably ranging from 1 to 4;

c is 0 or 1, preferably 0;

provided that the sum a+b+c is equal to 4 and that at least one between a and b is different from 0;

n is an integer ranging from 1 to 4, preferably 1 or 2.

The aforesaid process allows to obtain polycarbonates having a quantity of carbonate bonds in chain greater than 95%, preferably greater than 99%, even more preferably equal to 100%, or polycarbonate/polyether copolymers having a quantity of ether bonds in chain ranging from 15% to 90%, preferably ranging from 35% to 85%.

The subject matter of the present disclosure is also a catalytic system comprising: at least one catalyst selected from complexes of a transition metal; at least one co-catalyst selected from ionic compounds.

DETAILED DESCRIPTION OF THE DISCLOSURE

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims, the term "$C_1$-$C_{20}$ alkyl groups" indicates alkyl groups having from 1 to 20 carbon atoms, linear or branched, saturated or unsaturated. Specific examples of $C_1$-$C_{20}$ alkyl groups are: methyl, ethyl, n-propyl, iso-propyl, n-butyl, iso-butyl, tert-butyl, pentyl, hexyl, heptyl, octyl, 2-ethyheptyl, 2-ethylhexyl, 2-butenyl, 2-pentenyl, 2-ethyl-3-hexenyl, 3-octenyl, 1-methyl-4-hexenyl, 2-butyl-3-hexenyl.

For the purpose of the present description and of the following claims, the term "$C_1$-$C_{20}$ alkyl groups optionally containing heteroatoms" indicates alkyl groups having from 1 to 20 carbon atoms, linear or branched, saturated or unsaturated, wherein at least one of the hydrogen atoms is substituted with a heteroatom selected from halogens such as, for example, fluorine, chlorine, bromine, preferably fluorine; nitrogen; sulfur; oxygen. Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichlororoethyl, 2,2,3,3-tetrafluoropropyl, 2,2,3,3,3-pentafluoropropyl, perfluoropentyl, perfluoroctyl, perfluorodecyl, ethyl-2-methoxy, propyl-3-ethoxy, butyl-2-thiomethoxy, hexyl-4-amino, hexyl-3-N,N'-dimethylamino, methyl-N,N'-dioctylamino, 2-methylhexyl-4-amino.

For the purpose of the present description and of the following claims, the term "aryl groups" indicates aromatic carbocyclic groups containing from 6 to 60 carbon atoms. Said aryl groups may be optionally substituted with one or more groups, identical or different, selected from: halogen atoms such as, for example, fluorine, chlorine, bromine, preferably fluorine, hydroxy groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups; $C_1$-$C_{12}$ mono- or di-alkylamine groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

For the purpose of the present description and of the following claims, the term "heteroaryl groups" indicates aromatic heterocyclic penta- or hexa-atomic groups, also benzocondensates or heterobicyclic, containing from 4 to 60 carbon atoms and from 1 to 4 heteroatoms selected from nitrogen, oxygen, sulfur, silicon, selenium, phosphorus. Said heteroaryl groups may be optionally substituted with one or more groups, identical or different, selected from: halogen atoms such as, for example, fluorine, chlorine, bromine, preferably fluorine; hydroxy groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups, $C_1$-$C_{12}$ mono- or di-alkylamine groups; nitro groups. Specific examples of heteroaryl groups are: pyridine, methylpyridine, methoxypyridine, phenypyridine, fluoropyridine, pyrimidine, pyridazine, pyrazine, triazine, tetrazine, quinoline, quinoxaline, quinazoline, furan, thiophene, hexylthiophene, bromothiophene, dibromothiophene, pyrrole, oxazole, thiazole, isoxazole, isothiazole, oxadiazole, thiadiazole, pirazole, imidazole, triazole, tetrazole, indole, benzofuran, benzothiophene, benzoxazole, benzothiazole, benzooxadiazole, benzothiadiazole, benzopirazole, benzimidazole, benzotriazole, triazolepyridine, triazolepyrimidine, coumarin. Said optionally substituted heteroaryl groups may optionally be in the cationic form. Specific examples of heteroaryl groups in the cationic form are: pyridinium, N-methyl-pyridinium, N-butyl-pyridinium, N-phenyl-pyridinium, N-methyl-4-methoxy-pyridinium, N-ethyl-2-fluoro-pyridinium, pyrilium, trimethyl-pyrilium, 2,6-di-tert-butyl-pyrilium, 4-phenyl-2,6-dipropyl-pyrilium, 2,6-di-tert-butyl-thiopyrilium, 2,6-diphenyl-thiopyrilium.

For the purpose of the present description and of the following claims, the term "cycloalkyl groups" indicates cycloalkyl groups having from 3 to 60 carbon atoms. Said cycloalkyl groups may be optionally substituted with one or more groups, identical or different, selected from: halogen atoms, such as, for example, fluorine, chlorine, bromine, preferably fluorine, hydroxy groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups; $C_1$-$C_{12}$ mono- or di-alkylamine groups; nitro groups. Specific examples of cycloalkyl groups are: cyclopropyl, 2,2-difluorocyclopropyl, cyclobutyl, cyclopentyl, cyclohexyl, methylcyclohexyl, methoxycyclohexyl, fluorocyclohexyl, phenylcyclohexyl, decalin, abiethyl.

For the purpose of the present description and of the following claims, the term "heterocyclic groups" indicates rings having from 3 to 12 atoms, saturated or unsaturated, containing at least one heteroatom selected from nitrogen, oxygen, sulfur, silicon, selenium, phosphorus, optionally condensed with other aromatic or non-aromatic rings. Said heterocyclic groups may be optionally substituted with one or more groups, identical or different, selected from: halogen atoms such as, for example, fluorine, chlorine, bromine, preferably fluorine, hydroxy groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; polyethyleneoxy groups; cyano groups; amine groups; $C_1$-$C_{12}$ mono- or di-alkylamine groups; nitro groups. Specific examples of heterocyclic groups are: pyrrolidine, methoxypyrrolidine, piperidine, fluoropiperidine, methylpiperidine, dihydropyridine, piperazine, morpholine, thiazine, indoline, phenylindoline, 2-ketoazetidine, diketopiperazine, tetrahydrofuran, tetrahydrothiophene. Said optionally substituted heterocyclic groups may optionally be in cationic form. Specific examples of heterocyclic groups in cationic form are: N-butylpyrrolidinium, N,N'-dimethylpyrrolidinium, N,N'-diethylpyrrolidinium, N-ethyl,N'-phenylpyrrolidinium, N,N'-dimethylpiperidinium, N-methyl,N'-butylpiperidinium, N-methyl,N'-phenylpiperidinium.

For the purpose of the present description and of the following claims, the term "cyclo" indicates a system containing from 2 to 12 carbon atoms, optionally containing heteroatoms selected from nitrogen, oxygen, sulfur, silicon, selenium, phosphorus. Specific examples of cyclo are: toluene, benzonitrile, cycloheptatriene, cyclooctadiene, pyridine, piperidine, tetrahydrofuran, thiadiazole, pyrrole, thiophene, selenophene, tert-butylpyridine.

For the purpose of the present description and of the following claims, the term "trialkyl- or triaryl-silyl groups" indicates groups comprising a silicon atom to which three $C_1$-$C_{12}$ alkyl groups, or three $C_6$-$C_{24}$ aryl groups, or a combination thereof are linked. Specific examples of trialkyl- or triaryl-silyl groups are: trimethylsilane, triethylsilane, trihexylsilane, tridodecylsilane, dimethyl(dodecyl)silane, triphenylsilane, methyl(diphenyl)silane, dimethyl(naphthyl)silane.

For the purpose of the present description and of the following claims, the term "dialkyl- or diaryl-amine groups" indicates groups comprising a nitrogen atom to which two $C_1$-$C_{12}$ alkyl groups, or two $C_6$-$C_{24}$ aryl groups, or a combination thereof are linked. Specific examples of dialkyl- or diaryl-amine groups are: dimethyamine, diethylamine, dibutylamine, diisobutylamine, diphenylamine, methylphenylamine, dibenzylamine, ditolylamine, dinaphthylamine.

For the purpose of the present description and of the following claims, the term "dialkyl- or diaryl-phosphine groups" indicates groups comprising a phosphorus atom to which two $C_1$-$C_{12}$ alkyl groups, or two $C_6$-$C_{24}$ aryl groups, or a combination thereof are linked. Specific examples of dialkyl- or diaryl-phosphine groups are: dimethylphosphine, diethylphosphine, dibutylphosphine, diphenylphosphine, methylphenylphosphine, dinaphthylphosphine.

For the purpose of the present description and of the following claims, the term "$C_1$-$C_{20}$ alkoxy groups" indicates groups comprising an oxygen atom to which a linear or branched $C_1$-$C_{20}$ alkyl group is linked. Specific examples of $C_1$-$C_{20}$ alkoxy groups are: methoxy, ethoxy, n-propoxy, iso-propoxy, n-butoxy, iso-butoxy, tert-butoxy, pentoxy, hexyloxy, heptyloxy, octyloxy, nonyloxy, decyloxy, dodecyloxy.

For the purpose of the present description and of the following claims, the term "aryloxy groups" indicates groups comprising an oxygen atom to which a linear or branched $C_6$-$C_{24}$ aryl group is linked. Said aryloxy groups may be optionally substituted with one or more groups, identical or different, selected from: halogen atoms such as, for example, fluorine, chlorine, bromine, preferably fluorine, hydroxy groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; cyano groups; amine groups; $C_1$-$C_{12}$ mono- or di-alkylamine groups; nitro groups. Specific examples of aryloxy groups are: phenoxyl, para-methylphenoxyl, para-fluorophenoxyl, ortho-butylphenoxyl, naphtyloxyl, anthracenoxyl.

For the purpose of the present description and of the following claims, the term "thioalkoxy or thioaryloxy groups" indicates groups comprising a sulfur atom to which a $C_1$-$C_{12}$ alkoxy group or a $C_6$-$C_{24}$ aryloxy group is linked. Said thioalkoxy or thioaryloxy groups may be optionally substituted with one or more groups, identical or different, selected from: halogen atoms such as, for example, fluorine, chlorine, bromine, preferably fluorine, hydroxy groups; $C_1$-$C_{12}$ alkyl groups; $C_1$-$C_{12}$ alkoxy groups; $C_1$-$C_{12}$ thioalkoxy groups; $C_3$-$C_{24}$ trialkylsilyl groups; cyano groups; amine groups; $C_1$-$C_{12}$ mono- or di-alkylamine groups; nitro groups. Specific examples of thioalkoxy or thioaryloxy groups are: thiomethoxy, thioethoxy, thiopropoxy, thiobutoxy, thio-iso-butoxy, 2-ethylthiohexyloxy, thiophenoxy, para-methylthiophenoxy, para-fluorothiophenoxy, ortho-butylthiophenoxy, napthylthiooxy, anthracenylthiooxy.

For the purpose of the present description and of following claims, the term "oxylamine groups" indicates groups comprising an oxygen atom linked to a nitrogen atom to which two hydrogens are linked, or two linear or branched, saturated or unsaturated $C_1$-$C_{12}$ alkyl groups, optionally containing one or more heteroatoms selected from nitrogen, oxygen, sulfur, silicon, selenium, phosphorus, preferably nitrogen; or two $C_6$-$C_{24}$ aryl groups, or a combination thereof, or said two alkyl groups may be linked to each other so as to form, together with the nitrogen atom, a cycle containing from 3 to 12 atoms, preferably from 5 to 6 atoms. Specific examples of oxylamine groups are: hydroxylamine, organic compounds containing sterically hindered oxylamine groups such as, for example, 2,2,5,5-tetramethyl-3-pyrrolinoxyl (PROXYL) and derivatives thereof, 2,2,6,6-tetramethylpiperidine-1-oxyl (TEMPO) and derivatives thereof.

Specific examples of complexes of a transition metal having general formula (I) are indicated in Table 1.

TABLE 1

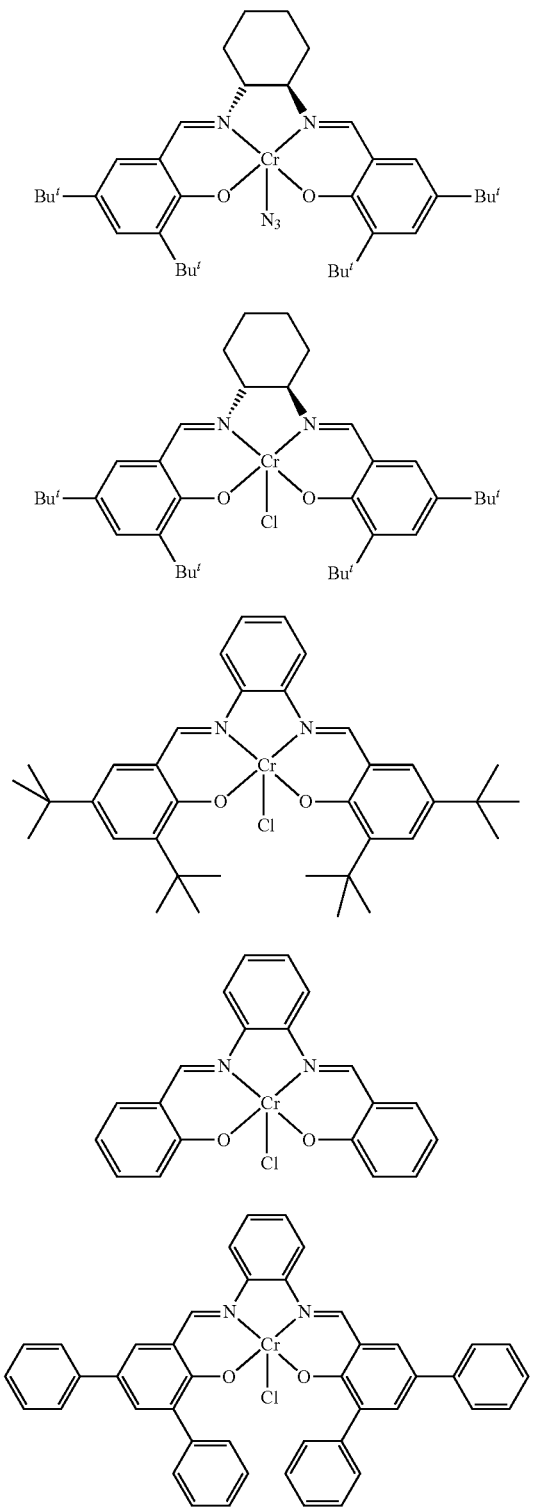

TABLE 1-continued
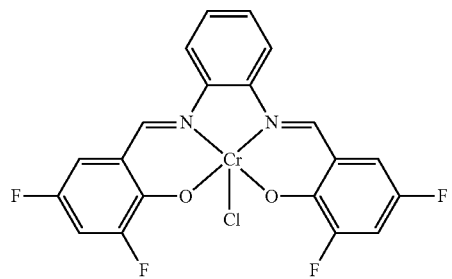
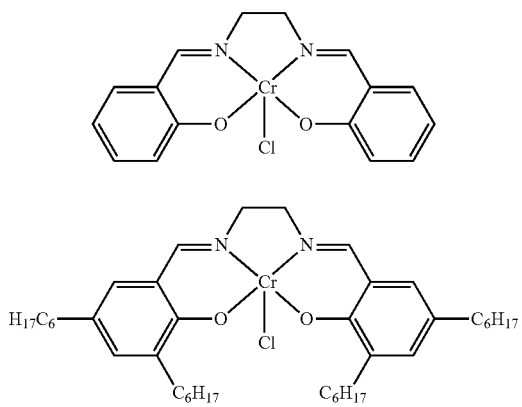
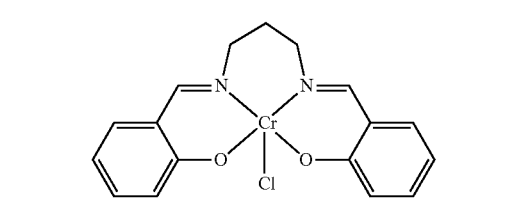
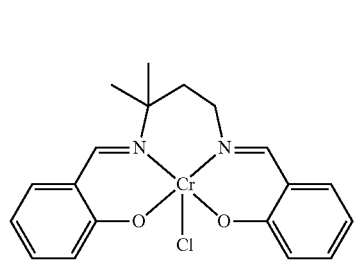
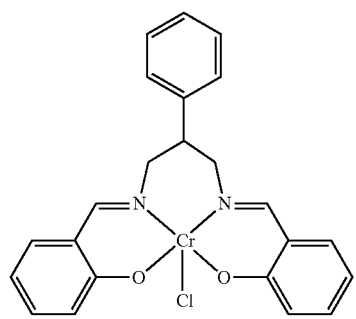
TABLE 1-continued
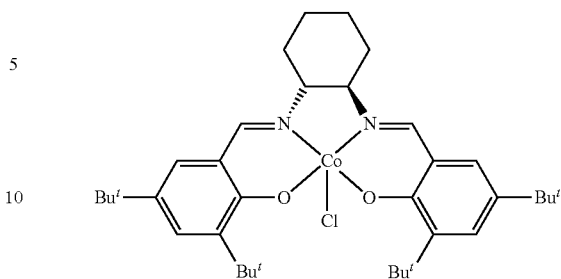
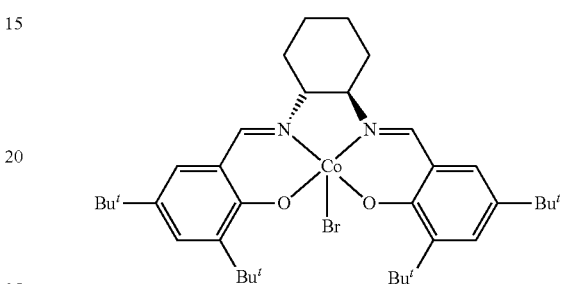
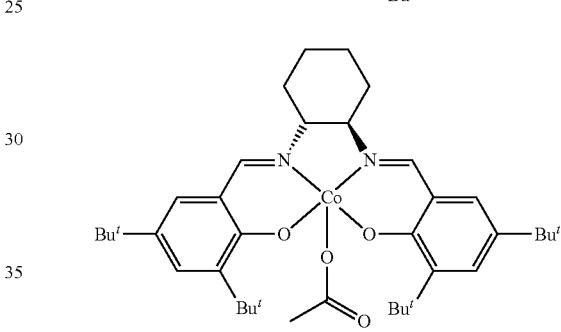
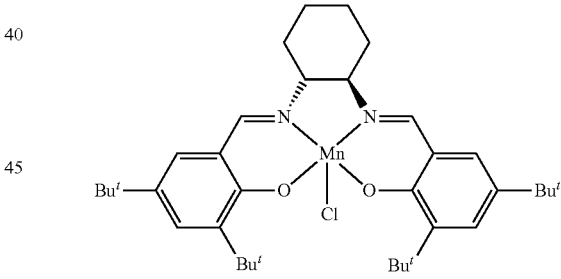
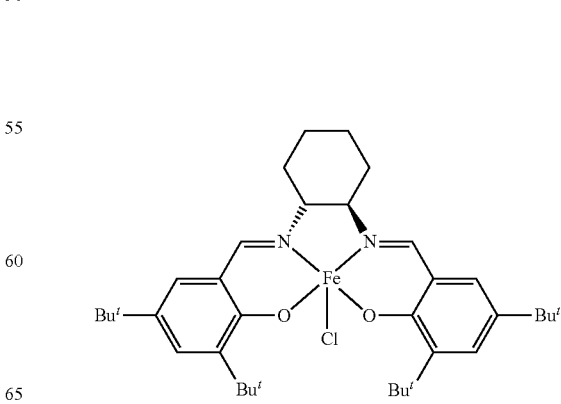

TABLE 1-continued

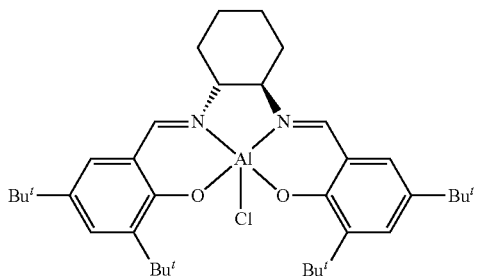

The complexes of a transition metal having general formula (I) may be prepared according to known processes in the prior art as described, for example, by Jacobsen E. N. et al, in "*Journal of Organic Chemistry*" (1994), Vol. 59(7), pag. 1939-1942. Further details related to the preparation of said complexes of a transition metal having general formula (I) may be found in the following examples. Some complexes of a transition metal having general formula (I) are, instead, commercially available. Specific examples of ionic compounds having general formula (V) are indicated in Table 2.

TABLE 2

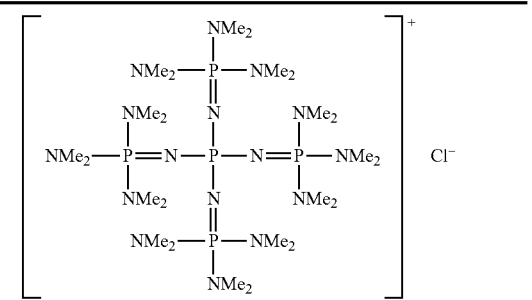

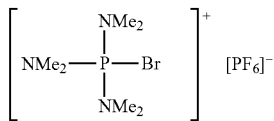

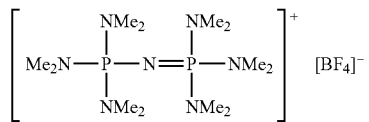

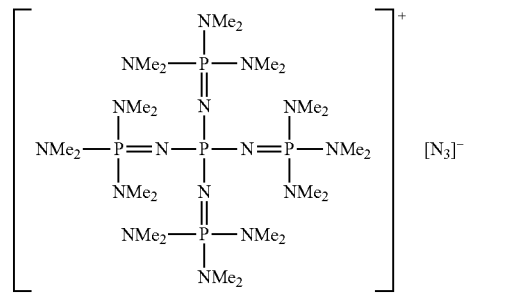

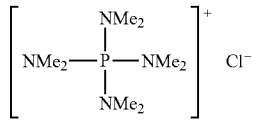

TABLE 2-continued

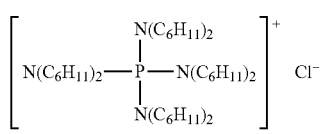

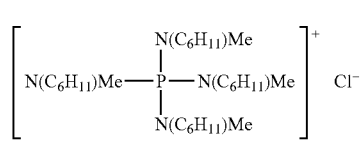

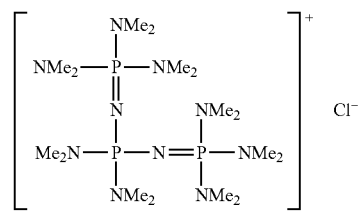

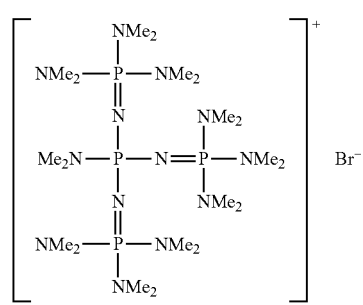

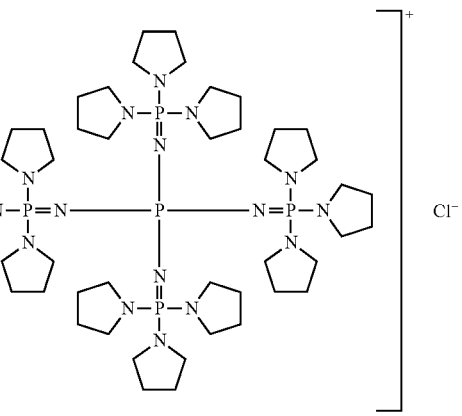

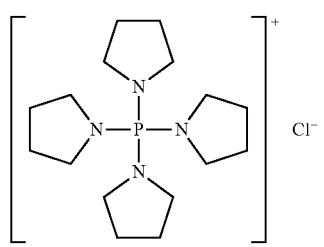

TABLE 2-continued
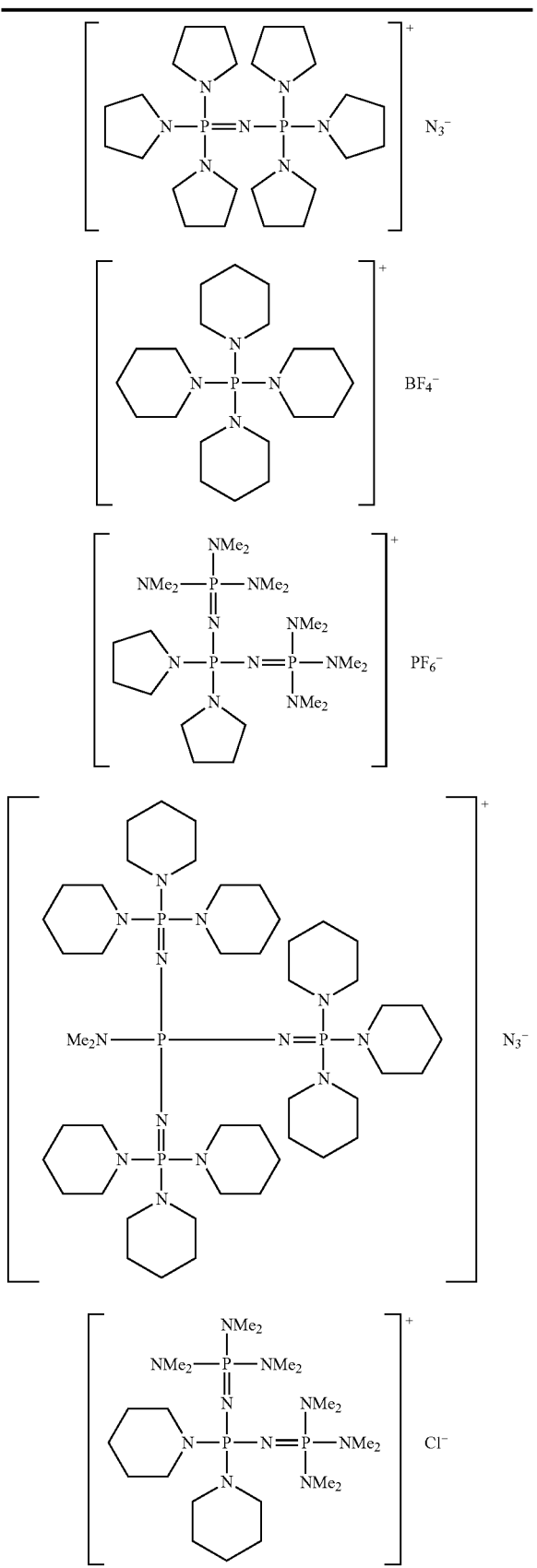
TABLE 2-continued
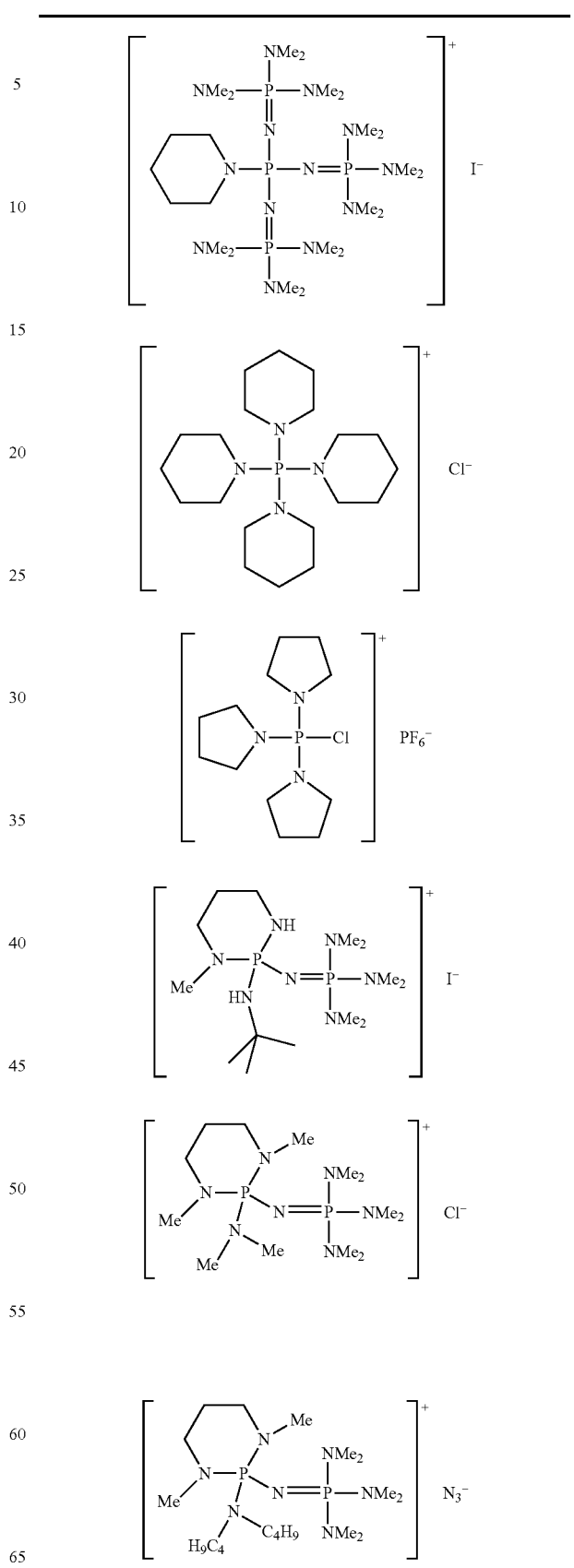

TABLE 2-continued

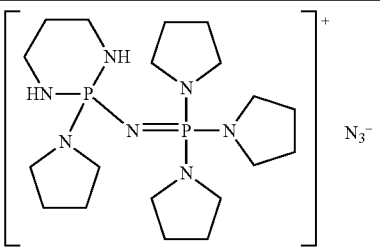

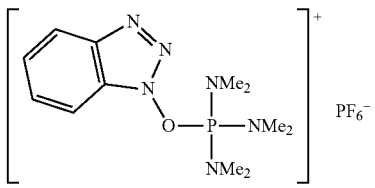

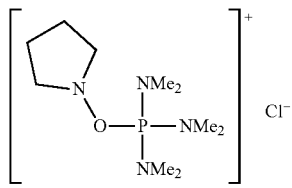

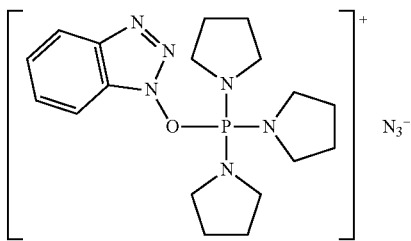

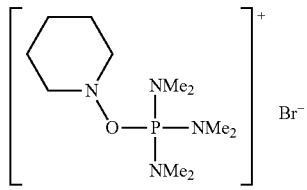

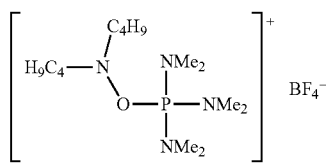

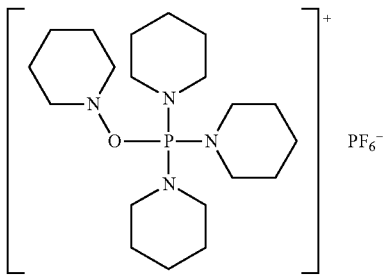

The ionic compounds having general formula (V) may be prepared according to known processes in the prior art as described, for example by Schwesinger R. et al, in "Chemistry a European Journal" (2006), Vol. 12, pag. 429-437; Schwesinger R. et al, in "Chemistry a European Journal" (2006), Vol. 12, pag. 438-445; Martinsen A. et al, in "Acta Chemica Scandinavica A" (1977), Vol. 31, pag. 645-650. Some ionic compounds having general formula (V) are, instead, commercially available.

In accordance with a preferred embodiment of the present disclosure, said epoxy compound may be selected, for example, from: $C_2$-$C_{20}$ alkylene oxides, optionally substituted with one or more halogen atoms or one or more alkoxy groups; $C_4$-$C_{20}$ cycloalkylene oxides, optionally substituted with one or more halogen atoms or one or more alkoxy groups; $C_8$-$C_{20}$ styrene oxides, optionally substituted with one or more halogen atoms or with one or more alkoxy, alkyl or aryl groups.

In accordance with a preferred embodiment of the present disclosure, said epoxy compound may be selected, for example, from ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorhydrin, epichlorhydrin, epibromhydrine, isopropyl glycidyl ether, butyl glycidyl ether, tert-butyl glycidyl ether, 2-ethylhexyl glycidyl ether, allyl glycidyl ether, cyclopentene oxide, cyclohexene oxide, cyclooctene oxide, cyclododecene oxide, α-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidylmethylphenyl ether, chlorophenyl-2,3-epoxypropyl ether, epoxypropyl methoxyphenyl ether, biphenyl glycidyl ether, glycidyl naphtyl ether, or mixtures thereof. Cyclohexene oxide, propylene oxide are preferred.

For the purpose of obtaining, at the end of the aforesaid process, a solution comprising polycarbonate and the catalytic system, said process may be carried out in the presence of an organic solvent.

In accordance with a preferred embodiment of the present disclosure, said process may be carried out in presence of at least one organic solvent which may be selected, for example, from: aliphatic hydrocarbons such as, for example, pentane, octane, decane, cyclopentane, cyclohexane, or mixtures thereof; aromatic hydrocarbons such as, for example, benzene, toluene, xylene, or mixtures thereof; halogenated hydrocarbons such as, for example, dichloromethane, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromo-benzene, or mixtures thereof; or mixtures thereof. Dichloromethane, toluene, heptane, are preferred.

In accordance with a preferred embodiment of the present disclosure, said organic solvent may be used in a ratio by volume with respect to said at least one epoxy compound ranging from 0:100 to 99:1, preferably ranging from 0:100 to 90:1.

In accordance with a further preferred embodiment, said at least one epoxy compound acts as a solvent.

In accordance with a preferred embodiment of the present disclosure, in said process said catalytic system and said at least one epoxy compound may be used in molar ratios ranging from 1:100 to 1:100000, preferably ranging from 1:1000 to 1:10000.

In accordance with a preferred embodiment of the present disclosure, in said catalytic system said at least one catalyst selected from complexes of a transition metal having general formula (I) and said at least one co-catalyst selected from ionic compounds having general formula (V) may be used in a molar ratio ranging from 100:1 to 1:100, preferably ranging from 2:1 to 1:2, more preferably it is 1:1.

In accordance with a preferred embodiment of the present disclosure, said process may be carried out at a temperature ranging from 20° C. to 250° C., preferably ranging from 40° C. to 160° C.

In accordance with a preferred embodiment of the present disclosure, said process may be carried out at a pressure ranging from 1 atm to 100 atm, preferably ranging from 2 atm to 60 atm.

In accordance with a preferred embodiment of the present disclosure, said process may be carried out for a time ranging from 30 minutes to 36 hours, preferably ranging from 3 hours to 24 hours.

The process according to the present disclosure may be carried out discontinuously (in batches), semi-continuously (in semi-batches), or continuously.

Preferably, the polycarbonate obtained according to the process object of the present disclosure has a number average molecular weight ($M_n$) ranging from 500 to 200000 and a polydispersion index (PDI) corresponding to the ratio between the weight average molecular weight ($M_w$) and the number average molecular weight ($M_n$) (i.e. to the ratio $M_w/M_n$) ranging from 1.01 to 6.0.

As mentioned above, the aforesaid catalytic system comprising at least one catalyst selected from complexes of a transition metal having general formula (I) and at least one co-catalyst selected from ionic compounds having general formula (V) allows the quantity of carbonate bonds present in the chain of the polycarbonate obtained to be modulated.

In fact, said catalytic system allows to obtain polycarbonates having a quantity of carbonate bonds in chain greater than 95%, preferably greater than 99%, even more preferably equal to 100%.

The polycarbonate obtained in accordance with the process object of the present disclosure, is easily degradable, does not form residue or ash in combustion, and may be advantageously used for packaging, insulations and coatings.

As mentioned above, the aforesaid process also allows to obtain polycarbonate/polyether copolymers having a quantity of ether bonds in chain ranging from 15% to 90%, preferably ranging from 35% to 85%.

In accordance with an embodiment of the present disclosure, said process allows to obtain a mixture comprising:
(a) at least one polycarbonate comprising a quantity of carbonate bonds in chain greater than 95%, preferably greater than 99%, even more preferably equal to 100%;
(b) at least one polycarbonate/polyether copolymer having a quantity of ether bonds in chain ranging from 15% to 90%, preferably ranging from 35% to 85%;
the weight ratio (a):(b) being ranging from 1000:1 to 1:1000, preferably ranging from 100:1 to 1:100.

In accordance with a preferred embodiment of the present disclosure, said at least one polyether is polypropylene oxide, polycyclohexene oxide.

The aforesaid mixture may be advantageously used for packaging, insulations, coatings.

As mentioned above, the object of the present disclosure is also a catalytic system comprising: at least one catalyst selected from complexes of a transition metal having general formula (I); at least one co-catalyst selected from ionic compounds having general formula (V).

Therefore, the present disclosure also relates to a catalytic system comprising:
at least one catalyst selected from complexes of a transition metal having general formula (I):

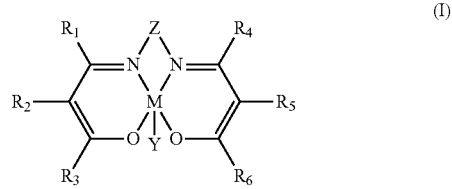

wherein:
M represents a metal atom selected from chromium, manganese, iron, cobalt, nickel, aluminum, preferably chromium, cobalt;

$R_1$, $R_2$, $R_3$, $R_4$, $R_5$ and $R_6$, mutually identical or different, represent a hydrogen atom; or they are selected from linear or branched, saturated or unsaturated, $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups;

or $R_2$ and $R_3$ and/or $R_5$ and $R_6$, may be linked together to form, together with the other atoms to which they are linked, a saturated, unsaturated or aromatic cycle containing from 2 to 12 carbon atoms, which may be optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

Y represents a halogen anion such as, for example, a fluoride anion, a chloride anion, a bromide anion, an iodide anion, preferably a chloride anion, a bromide anion; or it is selected from inorganic anions such as, for example, azide anion, hydroxide anion, amide anion, perchlorate anion, chlorate anion, sulfate anion, phosphate anion, nitrate anion, preferably an azide anion; or it is selected from organic anions such as, for example, $C_1$-$C_{20}$ alcoholate anion, $C_1$-$C_{20}$ thioalcoholate anion, $C_1$-$C_{30}$ carboxylate anion, $C_1$-$C_{30}$ alkyl- or dialkyl-amide anion;

Z represents a divalent organic radical having general formula (II), (III) or (IV):

-continued

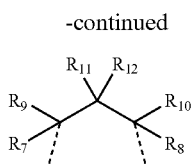
(IV)

wherein:
- $R_7$, $R_8$, $R_9$, $R_{10}$, $R_{11}$ and $R_{12}$, mutually identical or different, represent a hydrogen atom; or they are selected from linear or branched, saturated or unsaturated, $C_1$-$C_{20}$ alkyl groups, preferably $C_1$-$C_{12}$, optionally containing heteroatoms; optionally substituted aryl groups; optionally substituted heteroaryl groups; optionally substituted cycloalkyl groups; optionally substituted heterocyclic groups;
- or $R_7$ and $R_8$ in the general formula (II), or $R_8$ and $R_9$ or $R_9$ and $R_{10}$ in the general formula (III), or $R_7$ and $R_{11}$ or $R_7$ and $R_{12}$ or $R_{10}$ and $R_{12}$ or $R_{11}$ and $R_{10}$ in the general formula (IV), may be optionally linked to each other so as to form, together with the other atoms to which they are linked, a saturated, unsaturated, or aromatic, cycle containing from 2 to 12 carbon atoms, optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amino groups, dialkyl groups or diaryl-phosphine, linear or branched, saturated or unsaturated, $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;
- at least one co-catalyst selected from ionic compounds having general formula (V):

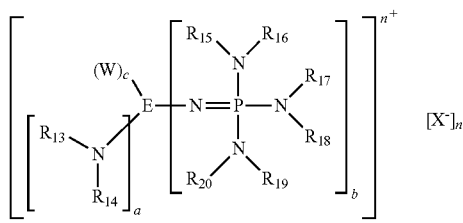
(V)

wherein:
- E represents an atom selected from phosphorus, arsenic, antimony, bismuth, preferably phosphorus;
- $R_{13}$, $R_{14}$, $R_{15}$, $R_{16}$, $R_{17}$, $R_{18}$, $R_{19}$ and $R_{20}$, mutually identical or different, represent a hydrogen atom; or they are selected from saturated or unsaturated, $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in cationic form, optionally substituted cycloalkyl groups, optionally substituted heterocyclic groups, said optionally substituted heterocyclic groups being optionally in cationic form, trialkyl- or triaryl-silyl groups;
- or $R_{13}$ and $R_{14}$, and/or $R_{15}$ and $R_{16}$, and/or $R_{16}$ and $R_{17}$ and/or $R_{17}$ and $R_{18}$, and/or $R_{19}$ and $R_{20}$, may be optionally linked together so as to form, together with the other atoms to which they are linked, a saturated, unsaturated, or aromatic cycle containing from 2 to 12 carbon atoms, optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amino groups, dialkyl- or diaryl-phosphino groups, linear or branched, saturated or unsaturated, $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;
- W represents a halogen atom such as, for example, chlorine, bromine, fluorine, iodine, preferably chlorine, bromine; or it is selected from linear or branched, saturated or unsaturated, $C_1$-$C_{20}$ alkoxy groups, preferably $C_2$-$C_{10}$, optionally substituted aryloxy groups, oxylamine groups;
- $X^-$ represents a halide anion such as, for example, a fluoride anion, a chloride anion, a bromide anion, an iodide anion, preferably a chloride anion, a bromide anion; or it is selected from inorganic anions such as, for example, azide anion, perchlorate anion, chlorate anion, sulfate anion, phosphate anion, nitrate anion, hexafluorophosphate anion, tetrafluoroborate anion; or it is selected from organic anions such as, for example, benzenesulfonate anion, toluenesulphonate anion, dodecyl sulfate anion, octylphosphate anion, dodecylphosphate anion, octadecylphosphate anion, phenylphosphate anion; or it is selected from tetraalkylborate anions optionally containing heteroatoms such as, for example, oxygen, sulfur, nitrogen, silicon, phosphorus, selenium, preferably oxygen, nitrogen; tetraarylborate anions optionally containing heteroatoms such as, for example, oxygen, sulfur, nitrogen, silicon, phosphorus, selenium, preferably oxygen, nitrogen; preferably a chloride anion, an azide anion;
- a is an integer ranging from 0 to 4, preferably ranging from 1 to 3;
- b is an integer ranging from 0 to 4, preferably ranging from 1 to 4;
- c is 0 or 1, preferably 0;
- provided that the sum a+b+c is equal to 4 and that at least one between a and b is different from 0;
- n is an integer ranging from 1 to 4, preferably 1 or 2.

For the purpose of understanding the present disclosure better and to put it into practice, below are some illustrative and non-limiting examples thereof.

EXAMPLES

Reagents and Materials

The list below reports the reagents and materials used in the following examples of the disclosure, their optional pre-treatments and their manufacturer:
- cyclohexene oxide (Aldrich): purity 98%, distilled over calcium hydride ($CaH_2$) in an inert atmosphere;

dichloromethane (CH$_2$Cl$_2$) (Aldrich) maintained at reflux temperature for 4 hours and distilled over calcium hydride (CaH$_2$);

carbon dioxide (CO$_2$) (Rivoira): pure, ≥99.8%, used as such;

N,N'-bis(3,5-di-tert-butylsalicylidene)-1,2-cyclohexanediaminochromium(III) chloride [Cr(Salen)Cl] (Aldrich): used as such;

tetrakis[tris(dimethylamino)phosphoranylidenamino] phosphonium chloride (PPZCl) (Aldrich): used as such;

1,1,1,3,3,3-hexakis(dimethylamino)diphosphazenium tetrafluoroborate (HPBF$_4$) (Aldrich): used as such;

bromotris(dimethylamino)phosphonium hexafluorophosphate (PBrPF$_6$) (Aldrich): used as such;

silver perchlorate (AgClO$_4$) (anhydrous) (Aldrich): used as such;

acetonitrile (CH$_3$CN) (anhydrous) (Aldrich): pure, ≥99.8%, used as such;

sodium azide (NaN$_3$) (Aldrich): pure, ≥99.5%, used as such;

diethylether (C$_2$H$_5$)$_2$O (Aldrich): used as such;

magnesium sulfate (MgSO$_4$) (Merck): pure, ≥99.5%, used as it is;

o-phenylenediamine (Aldrich): used as such;

3,5-di-tert-butylsalicylaldehyde (Aldrich): used as such;

methanol (MeOH) (anhydrous) (Aldrich): pure, 99.8%, used as such;

ethanol (EtOH) (anhydrous) (Aldrich): pure, 99.8%, used as such;

formic acid (HCOOH) (Aldrich): 95-97%, used as such;

sodium chloride (NaCl) (Aldrich): pure, ≥99%, used as such;

chromium(II) chloride (CrCl$_2$) (Aldrich): 95%, used as such;

tetrahydrofuran (THF) (anhydrous) (Aldrich): used as such;

ammonium chloride (NH$_4$Cl) (Merck): pure, ≥99.9%, used as such;

hydrochloric acid in 37% aqueous solution (Merck): used as such;

acetone [(CH$_3$)$_2$O] (Aldrich): used as such;

deuterated methylene chloride (CD$_2$Cl$_2$) (Merck): used as such.

Elementary Analysis a) Determination of Carbon, Hydrogen, Nitrogen, Chromium and Phosphorus The determination of carbon, hydrogen, nitrogen, chromium and phosphorus in the compounds synthesized in the following examples, was carried out through a Carlo Erba automatic analyzer Mod. 1106.

NMR Spectra

The NMR spectra of the compounds synthesized in the following examples were acquired with an NMR Bruker Avance 400 spectrometer.

For that purpose, about 10 mg of the sample to be examined were dissolved in about 0.8 ml of CD$_2$Cl$_2$ (deuterated methylene chloride) directly in the glass tube used for the measurement. The chemical shift scale was calibrated in relation to the signal of the dichloromethane set to 5.30 ppm. The experimental parameters used were as follows:

128 scans;
90° pulse;
delay: 2 s, +4.5 s, of acquisition time;
spectral amplitude: 7200 Hz.

Differential Scanning Calorimetry (DSC)

The Differential Scanning calorimetry (DSC), for the purpose of determining the glass transition temperature (T$_g$) of the polymers obtained, was carried out using a Perkin Elmer Pyris differential scanning calorimeter. For that purpose, 5 mg of polymer to be analyzed were analyzed, with a scanning speed ranging from 1° C./min to 20° C./min, in an inert nitrogen atmosphere.

Determination of the Molecular Weight

The determination of the weight average molecular weight (M$_w$) and of the number average molecular weight (M$_n$) of the polymers obtained was carried out through GPC (Gel Permeation Chromatography), using the Waters® Alliance® GPC/V 2000 System by Waters Corporation which uses two detection lines: Refractive Index—RI and Viscometer operating under the following conditions:

two PLgel Mixed-B columns;
solvent/eluent: o-dichlorobenzene (Aldrich);
flow rate: 0.8 ml/min;
temperature: 145° C.;
molecular mass calculation: Universal Calibration method.

The number average molecular weight (M$_n$), the weight average molecular weight (M$_w$) and the polydispersion index (PDI) (M$_w$/M$_n$ ratio) are reported.

Example 1

Synthesis of N,N'-bis(3,5-di-tert-butylsalicylidene)-1,2-cyclohexanediamino chromium(III) azide [Cr(Salen)N$_3$]

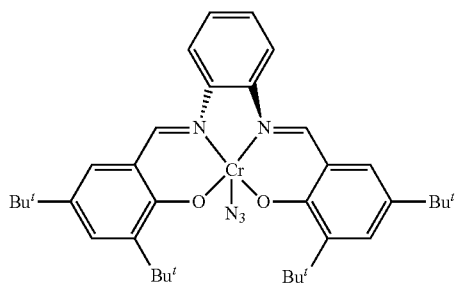

2 g (3.16 mmoles) of N,N'-bis(3,5-di-tert-butylsalicylidene)-1,2-cyclohexanediamino chromium(III) chloride [Cr(Salen)Cl] and 0.65 g (3.16 mmoles) of anhydrous silver perchlorate (AgClO$_4$) were dissolved, respectively, in 120 ml (in a 200 ml two-neck flask) and in 30 ml (in a 500 ml two-neck flask) of anhydrous acetonitrile (CH$_3$CN), under nitrogen flow (N$_2$), at ambient temperature (25° C.). The solution of N,N'-bis(3,5-di-tert-butylsalicylidene)-1,2-cyclohexanediamino chromium(III) chloride [Cr(Salen)Cl] obtained was then dripped, in about 30 minutes, into the solution of silver perchlorate (AgClO$_4$) obtained. The reaction mixture obtained was left, under stirring, at ambient temperature (25° C.), for one night. Subsequently, the reaction mixture was filtered in order to separate the silver chloride (AgCl) precipitate and, after filtration, 0.62 g (9.48 mmoles) of sodium azide (NaN$_3$) were added: everything was left, under stirring, at ambient temperature (25° C.), for one night, for the purpose of promoting the slow dissolution of sodium azide (NaN$_3$) in the acetonitrile (CH$_3$CN).

Subsequently, the mixture obtained was diluted with 150 ml of diethyl ether [(C$_2$H$_5$)$_2$O], then washed with water (3×100 ml) obtaining an aqueous phase and an organic phase that were separated through a separatory funnel. The organic phase obtained was anhydrified on magnesium sulfate (MgSO$_4$), filtered and the residual solvent was removed, under vacuum, obtaining 2.1 g of a green solid product (yield 88%) corresponding to N,N'-bis(3,5-di-tert-butylsalicylidene)-1,2-cyclohexanediamino chromium(III) azide [Cr(Salen)N$_3$].

Elementary analysis [found (calculated for C$_{36}$H$_{52}$N$_5$O$_2$Cr): C 66.31% (67.68%); H 7.94% (8.20%); N 9.87% (10.96%).

Example 2

Synthesis of N,N'-bis(3,5-di-tert-butylsalicylidene)-1,2-benzodiamine (SalaphenH$_2$)

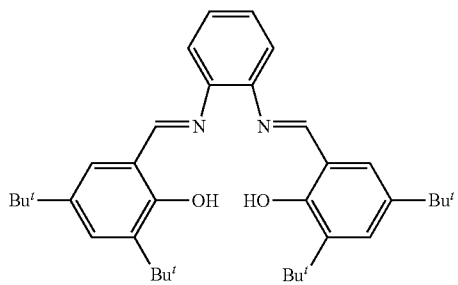

In a 500 ml two-neck flask, 2.0 g (18.5 mmoles) of o-phenylenediamine and 8.67 g (37.0 mmoles) of 3,5-di-tert-butyl-salicylaldehyde were dissolved in 200 ml of anhydrous methanol (MeOH). A few drops (about 0.7 ml) of concentrated formic acid (HCOOH) were added to the solution obtained and the mixture was then refluxed for about 3 hours: the precipitation of a yellow-orange solid was observed. The progress of the reaction was observed through thin layer chromatography (TLC). At the end of the reaction, the solid obtained was separated through filtration, washed with cold anhydrous methanol (MeOH), subsequently dissolved in 20 ml of dichloromethane (CH$_2$Cl$_2$) and washed with water (2×100 ml) and subsequently with a saturated sodium chloride solution (NaCl) (2×100 ml) obtaining an aqueous phase and an organic phase that were separated through a separatory funnel. The organic phase obtained was anhydrified on magnesium sulfate (MgSO$_4$), filtered and the residual solvent was removed, under vacuum, obtaining 7.5 g of an orange solid product (yield 75%) corresponding to N,N'-bis(3,5-di-tert-butylsalicylidene)-1,2-benzodiamine (SalaphenH$_2$).

$^1$H NMR (CD$_2$Cl$_2$, 600 MHz); δ (ppm) 8.71 (s, CH=N, 2H), 7.46-7.27 (m, 8H), 1.44 (s, 18H), 1.33 (s, 18H).

Example 3

Synthesis of N,N'-bis(3,5-di-tert-butylsalicylidene)-1,2-benzodiamino chromium(III) chloride [Cr(Salaphen)Cl]

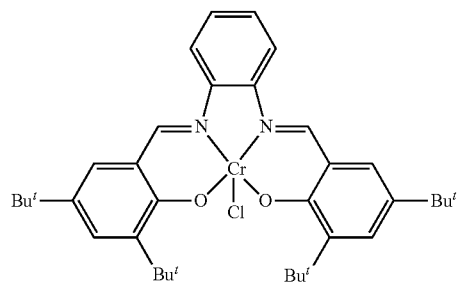

In a 200 ml two-neck flask, 0.5 g (0.924 mmoles) of N,N'-bis(3,5-di-tert-butyl salicylidene)-1,2-benzodiamino (SalaphenH$_2$) obtained as described in Example 2 and 0.125 g (0.996 mmoles) of chromium(II) chloride (CrCl$_2$), were dissolved, under nitrogen flow (N$_2$), in 50 ml of anhydrous tetrahydrofuran (THF). The solution obtained was left, under stirring, at ambient temperature (25° C.), for 24 hours, under nitrogen flow (N$_2$) and, subsequently, for another 24 hours, in air. The mixture obtained was diluted with 50 ml of diethyl ether [(C$_2$H$_5$)$_2$O], then extracted with a saturated solution of ammonium chloride (NH$_4$Cl) (3×100 ml) and subsequently with a saturated solution of sodium chloride (NaCl) (2×80 ml) obtaining an aqueous phase and an organic phase that were separated through a separatory funnel. The organic phase obtained was anhydrified on magnesium sulfate (MgSO$_4$), filtered and the residual solvent was removed, under vacuum, obtaining 0.466 g of a green microcrystalline powder (yield 82%) corresponding to N,N'-bis(3,5-di-tert-butylsalicylidene)-1,2-benzodiamino chromium(III) chloride [Cr(Salaphen)Cl].

Elementary analysis [found (calculated for C$_{36}$H$_{46}$N$_2$O$_2$CrCl): C 68.47% (69.05%); H 7.72% (7.40%); N 4.28% (4.47%).

$^1$H NMR (CD$_2$Cl$_2$, 400 MHz); δ (ppm) 8.87 (s, CH=N, 2H), 7.46-7.14 (m, 8H), 1.44 (s, 18H), 1.33 (s, 18H).

Example 4

Synthesis of tetrakis[tris(dimethylamino)phosphoranylidenamino]phosphonium azide (PPZN$_3$)

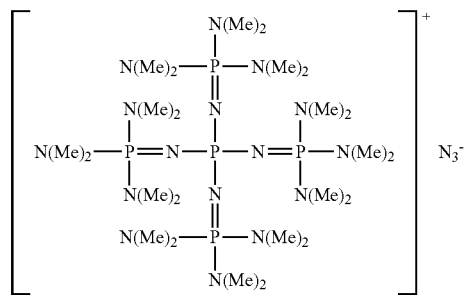

1.0 g (1.29 mmoles) of tetrakis[tris(dimethylamino)phosphoranylidenamino]phosphonium chloride (PPZCl) and 0.09 g (1.41 mmoles) of sodium azide ($NaN_3$), were dissolved in a 200 ml two-neck flask, under nitrogen flow ($N_2$), in 10 ml of ethanol (EtOH) anhydrous. The solution obtained was left, under stirring, at ambient temperature (25° C.), for 5 hours, under nitrogen flow ($N_2$): the precipitation of sodium chloride (NaCl) was observed. Subsequently, the solution obtained was filtered to remove the sodium chloride (NaCl) and the solvent was removed, under vacuum, at ambient temperature (25° C.) obtaining a colorless solid residue that was dissolved in acetonitrile ($CH_3CN$) anhydrous (5 ml) and precipitated by adding diethyl ether [$(C_2H_5)_2O$] (75 ml). Then, the colorless solid obtained was recovered through filtration and dried at reduced pressure (0.01 atm), at ambient temperature (25° C.) obtaining 0.75 g of a white microcrystalline powder (yield 74%) corresponding to tetrakis[tris(dimethylamino)phosphoranylidenamino]-phosphonium azide ($PPZN_3$).

Elementary analysis [found (calculated for $C_{24}H_{72}N_{19}P_5$): C 36.50% (36.87%); H 9.10% (9.28%); N 34.8% (34.04%).

$^1$H NMR ($CD_2Cl_2$, 400 MHz); δ (ppm) 2.59 (d, 72H).

Examples 5-10

Preparation of Polycyclohexenecarbonate (Constant Pressure)

A 250 ml steel autoclave was cleaned thorough careful washing with acetone [$(CH_3)_2O$] and anhydrous methanol (MeOH) and subsequently maintained, under vacuum, at 80° C., for 12 hours.

In the meantime, in a dry box, 0.073 mg (0.115 mmoles) of N,N'-bis(3,5-di-tert-butyl-salicylidene)-1,2-cyclohexanediamino chromium(III) chloride[Cr(Salen)Cl] and 0.089 mg (0.115 mmoles) of tetrakis[tris(dimethylamino)phosphoranylidenamino]phosphonium chloride (PP2Cl) were weighed in a Schlenk flask. Subsequently, 5 ml of dichloromethane ($CH_2Cl_2$) were added: the mixture obtained was left, under stirring, at ambient temperature (25° C.), for 1 hour. The solvent was then removed, under vacuum, and 25 ml of cyclohexene oxide were added to the catalytic system obtained: the reaction mixture obtained was left, under stirring, at ambient temperature (25° C.), for 15 minutes and then inserted, under vacuum, into an autoclave at the working temperature of 80° C. Once inserted into the autoclave, the reaction mixture was maintained, under stirring for 2 minutes and, subsequently, carbon dioxide ($CO_2$) was added at a pressure of 30 atm. The pressure was kept constant by means of a system of flow meter valves for the entire duration of the polymerization. The polymerization reaction was carried out for 3.5 hours, at the end of which the autoclave was cooled to 30° C. and the pressure was brought to 1 atm.

The semisolid viscous solution obtained was collected from the autoclave and purified through dissolution in dichloromethane ($CH_2Cl_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Examples 6-10 were carried out operating under the same conditions described above with the difference being the use of different catalytic systems (i.e. different catalysts and co-catalysts) or the addition of a different solvent. In particular:

Example 6: 0.073 g (0.115 mmoles) of N,N'-bis(3,5-di-tert-butylsalicylidene)-1,2-cyclohexanediamino chromium(III) chloride [Cr(Salen)Cl] and 0.090 g (0.115 mmoles) of tetrakis[tris(dimethylamino)phosphoranylidenamino]phosphonium azide ($PPZN_3$) obtained as described in Example 4;

Example 7: 0.037 g (0.057 mmoles) of N,N'-bis(3,5-di-tert-butylsalicylidene)-1,2-benzodiamino chromium (III) chloride [Cr(Salaphen)Cl] obtained as described in Example 2 and 0.089 mg (0.115 mmoles) of tetrakis[tris(dimethylamino)phosphoranylidenamino]phosphonium chloride (PPZCl);

Example 8: 0.037 g (0.057 mmoles) of N,N'-bis(3,5-di-tert-butylsalicylidene)-1,2-benzodiamino chromium (III) chloride [Cr(Salaphen)Cl] obtained as described in Example 2 and 0.045 g (0.057 mmoles) of tetrakis[tris(dimethylamino)phosphoranylidenamino]phosphonium azide ($PPZN_3$) obtained as described in Example 4;

Example 9: 0.073 g (0.115 mmoles) of N,N'-bis(3,5-di-tert-butylsalicylidene)-1,2-cyclohexanediamino chromium(III) azide [Cr(Salen)$N_3$] obtained as described in Example 1 and 0.089 mg (0.115 mmoles) of tetrakis[tris(dimethylamino)phosphoranylidenamino]phosphonium chloride (PPZCl);

Example 10: 0.073 g (0.115 mmoli) di N,N'-bis(3,5-di-tert-butylsalicylidene)-1,2-cyclohexanediamine chromium(III) azide [Cr(Salen)Cl] and 0.089 mg (0.115 mmoles) of tetrakis[tris(dimethylamino)phosphoranylidenamino]phosphonium chloride (PPZCl), furthermore, 25 ml of dichloromethane ($CH_2Cl_2$) were added to the reaction mixture, prior to introduction into the autoclave.

The polycyclohexene carbonate obtained from every example was therefore characterized through thermal analysis (DSC) ("Differential Scanning calorimetry") and GPC ("Gel Permeation Chromatography"): the results obtained are shown in Table 3 in which they are shown in the following order: the Example number, the type and quantity in mmoles of catalyst, the type and quantity in mmoles of co-catalyst, the conversion expressed as a percentage and measured through NMR spectrum ($^1$H-NMR) on the reaction crude so as to determine the amount of cyclohexene oxide converted to polycyclohexene carbonate or cyclohexene carbonate, the selectivity expressed as a percentage and measured through NMR spectrum ($^1$H-NMR) on the reaction crude so as to determine the amount of cyclohexene carbonate obtained, the amount of ether bonds present in the polycyclohexene carbonate obtained after purification expressed as a percentage and measured through NRM spectrum ($^1$H-NMR), the number average molecular weight ($M_n$) in g/mole, the number average molecular weight ($M_w$) in g/mole, the polydispersion Index (PDI) (ratio $M_w/M_n$) and the glass transition temperature ($T_g$) in degrees centigrade.

TABLE 3

| Example | Catalyst (mmoles) | Co-catalyst (mmoles) | Conversion (%) | Selectivity (%) | Ether bonds (%) | $M_n$ (g/mole) | $M_w$ (g/mole) | $M_w/M_n$ | Tg (° C.) |
|---|---|---|---|---|---|---|---|---|---|
| 5 | Cr(Salen)Cl (0.115) | PPZCl (0.115) | 85 | >99 | — | 14385 | 16445 | 1.14 | 117 |
| 6 | Cr(Salen)Cl (0.115) | PPZN$_3$ (0.115) | 86 | >99 | — | 10424 | 12800 | 1.23 | 119 |
| 7 | Cr(Salaphen)Cl (0.057) | PPZCl (0.115) | 44 | 97 | — | 7160 | 8404 | 1.17 | 117 |
| 8 | Cr(Salaphen)Cl (0.057) | PPZN$_3$ (0.057) | 39 | >99 | — | 5577 | 6984 | 1.25 | 118 |
| 9 | Cr(Salen)N$_3$ (0.115) | PPZCl (0.115) | 83 | 97 | — | 13142 | 15365 | 1.17 | 115 |
| 10 | Cr(Salen)Cl (0.115) | PPZCl (0.115) | 46 | >99 | 0.1 | 9227 | 10854 | 1.17 | 116 |

Examples 11-13

Preparation of Polycyclohexenecarbonate (Variable Pressure)

A 250 ml steel autoclave was cleaned thorough careful washing with acetone [(CH$_3$)$_2$O] and anhydrous methanol (MeOH) and subsequently maintained, under vacuum, at 80° C., for 12 hours.

In the meantime, in a dry box, 0.073 mg (0.115 mmoles) of N,N'-bis(3,5-di-tert-butyl-salicylidene)-1,2-cyclohexanediamino chromium(III) chloride[Cr(Salen)Cl] and 0.089 mg (0.115 mmoles) of tetrakis[tris(dimethylamino)phosphoranylidenamino]phosphonium chloride (PPZCl) were weighed in a Schlenk flask and, subsequently, 5 ml of dichloromethane (CH$_2$Cl$_2$) were added: the mixture obtained was left, under stirring, at ambient temperature (25° C.), for 1 hour. The solvent was then removed, under vacuum, and 25 ml of cyclohexene oxide were added to the catalytic system obtained: the reaction mixture obtained was left, under stirring, at ambient temperature (25° C.), for 15 minutes and then inserted, under vacuum, into an autoclave at the working temperature of 80° C. Once inserted into the autoclave, the reaction mixture was maintained, under stirring for 2 minutes and, subsequently, carbon dioxide (CO$_2$) was added at a pressure of 30 atm. The polymerization reaction was carried out for 3.5 hours, at the end of which, the pressure inside the autoclave had dropped to 15 atm. Subsequently, the autoclave was cooled to 30° C. and the pressure was brought to 1 atm.

The semisolid viscous solution obtained was collected from the autoclave and purified through dissolution in dichloromethane (CH$_2$Cl$_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Examples 12 and 13 were carried out operating under the same conditions described above with the difference being the use of different catalytic systems (i.e. different catalysts and co-catalysts). In particular, Example 12: 0.073 g (0.115 mmoles) of N,N'-bis(3,5-di-tert-butylsalicylidene)-1,2-cyclohexanediamino chromium(III) chloride [Cr(Salen)Cl] and 0.045 g (0.115 mmoles) of bromotris(dimethylamino)phosphonium hexafluorophosphate (PBrPF$_6$);

Example 13: 0.073 g (0.115 mmoles) of N,N'-bis(3,5-di-tert-butylsalicylidene)-1,2-cyclohexanediamino chromium(III) chloride [Cr(Salen)Cl] and 0.049 g (0.115 mmoles) of 1,1,1,3,3,3-hexakis(dimethylamino)diphosphazenium tetrafluoroborate (HPBF$_4$).

The polycyclohexene carbonate obtained from every example was therefore characterized through thermal analysis (DSC) ("Differential Scanning calorimetry") and GPC ("Gel Permeation Chromatography"). The results obtained are shown in Table 4 in which they are shown in the following order: the Example number, the type and quantity in mmoles of catalyst, the type and quantity in mmoles of co-catalyst, the conversion expressed as a percentage and measured through NMR spectrum ($^1$H-NMR) on the reaction crude so as to determine the amount of cyclohexene oxide converted to polycyclohexene carbonate or cyclohexene carbonate, the selectivity expressed as a percentage and measured through NMR spectrum ($^1$H-NMR) on the reaction crude so as to determine the amount of cyclohexene carbonate obtained with respect to the quantity of polycyclohexene carbonate obtained, the amount of ether bonds present in the polycyclohexene carbonate obtained after purification expressed as a percentage and measured through NRM spectrum ($^1$H-NMR), the number average molecular weight ($M_n$) in g/mole, the number average molecular weight ($M_w$) in g/mole, the polydispersion Index (PDI) (ratio $M_w/M_n$) and the glass transition temperature ($T_g$) in degrees centigrade.

TABLE 4

| Example | Catalyst (mmoles) | Co-catalyst (mmoles) | Conversion (%) | Selectivity (%) | Ether bonds (%) | $M_n$ (g/mole) | $M_w$ (g/mole) | $M_w/M_n$ |
|---|---|---|---|---|---|---|---|---|
| 11 | Cr(Salen)Cl (0.115) | PPZCl (0.115) | 73 | 99.9 | — | 15500 | 17658 | 1.14 |
| 12 | Cr(Salen)Cl (0.115) | PBrPF$_6$ (0.115) | 30 | 99.5 | 88.0 | 11903 | 21634 | 1.80 |
| 13 | Cr(Salen)Cl (0.115) | HPBF$_4$ (0.115) | 8 | 99.3 | 19.3 | 10128 | 16234 | 1.60 |

Examples 14-15

Preparation of Polypropylene Carbonate (Variable Pressure)

A 250 ml steel autoclave was cleaned thorough careful washing with acetone [$(CH_3)_2O$] and anhydrous methanol (MeOH) and subsequently maintained, under vacuum, at 80° C., for 12 hours.

In the meantime, in a dry box, 0.074 mg (0.115 mmoles) of N,N'-bis(3,5-di-tert-butyl-salicylidene)-1,2-benzodiamino chromium(III) chloride [Cr(Salaphen)Cl] obtained as described in Example 2 and 0.045 mg (0.057 mmoles) of tetrakis[tris(dimethylamino)-phosphoranylidenamino]phosphonium chloride (PPZCl) were weighed in a Schlenk flask and, subsequently, 5 ml of dichloromethane ($CH_2Cl_2$) were added: the mixture obtained was left, under stirring, at ambient temperature (25° C.), for 1 hour. The solvent was then removed, under vacuum, and 25 ml of propylene oxide were added to the catalytic system obtained: the reaction mixture obtained was left, under stirring, at ambient temperature (25° C.), for 15 minutes and then inserted, under vacuum, into an autoclave at the working temperature of 60° C. Once inserted into the autoclave, the reaction mixture was maintained, under stirring for 2 minutes and, subsequently, carbon dioxide ($CO_2$) was added at a pressure of 30 atm. The polymerization reaction was carried out for 3.5 hours, at the end of which, the pressure inside the autoclave had dropped to 18 atm. Subsequently, the autoclave was cooled to 30° C. and the pressure was brought to 1 atm.

The semisolid viscous solution obtained was collected from the autoclave and purified through dissolution in dichloromethane ($CH_2Cl_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Example 15 was carried out operating under the same conditions described above with the difference being the use of a different catalytic system (i.e. different catalyst). In particular:

Example 15: 0.074 g (0.115 mmoles) of N,N'-bis(3,5-di-tert-butylsalicylidene)-1,2-salicylidene)-1,2-benzodiamino chromium(III) chloride [Cr(Salaphen)Cl] obtained as described in Example 2 and 0.025 g (0.115 mmoles) of 1,1,1,3,3,3-hexakis(dimethylamino)diphosphazenium tetrafluoroborate (HPBF$_4$).

The polypropylene carbonate obtained from every example was therefore characterized through thermal analysis (DSC) ("Differential Scanning calorimetry") and GPC ("Gel Permeation Chromatography"): the results obtained are shown in Table 5 in which they are shown in the following order: the Example number, the type and quantity in mmoles of catalyst, the type and quantity in mmoles of co-catalyst, the conversion expressed as a percentage and measured through NMR spectrum ($^1$H-NMR) on the reaction crude so as to determine the amount of propylene oxide converted to polypropylene carbonate or propylene carbonate, the selectivity expressed as a percentage and measured through NMR spectrum ($^1$H-NMR) on the reaction crude so as to determine the amount of propylene carbonate obtained with respect to the amount of polypropylene carbonate obtained, the amount of ether bonds present in the polypropylene carbonate obtained after purification expressed as a percentage and measured through NRM spectrum ($^1$H-NMR), the number average molecular weight ($M_n$) in g/mole, the number average molecular weight ($M_w$) in g/mole and the polydispersion Index (PDI) (ratio $M_w/M_n$).

TABLE 5

| Example | Catalyst (mmoles) | Co-catalyst (mmoles) | Conversion (%) | Selectivity (%) | $M_n$ (%) | $M_n$ (g/mole) | $M_w$ (g/mole) | $M_w/M_n$ | $T_g$ (° C.) |
|---|---|---|---|---|---|---|---|---|---|
| 14 | Cr(Salaphen)Cl (0.115) | PPZCl (0.057) | 79 | 85 | 5 | 32300 | 42500 | 1.27 | 118 |
| 15 | Cr(Salaphen)Cl (0.115) | HPBF$_4$ (0.057) | 26 | 35 | 36 | 8900 | 9900 | 1.11 | — |

The invention claimed is:

1. Process for preparing polycarbonate comprising copolymerizing an epoxy compound and carbon dioxide ($CO_2$) in the presence of a catalytic system comprising:
   N,N'-bis(3,5-di-tert-butyl-salicylidene)-1,2-cyclohexanediamino chromium (III) chloride[Cr(Salen) Cl] catalyst and
   tetrakis[tris(dimethylamino)phosphoranylidenamino] phosphonium chloride co-catalyst,
   wherein said process is carried out
   at a temperature ranging from 20° C. to 250° C.;
   at a pressure ranging from 1 atm to 100 atm; and
   for a time ranging from 30 minutes to 36 hours.

2. Process for preparing polycarbonate according to claim 1, wherein said epoxy compound is selected from the group consisting of $C_2$-$C_{20}$ alkylene oxides, optionally substituted with one or more halogen atoms or with one or more alkoxy groups; $C_4$-$C_{20}$ cycloalkylene oxides, optionally substituted with one or more halogen atoms or with one or more alkoxy groups; and $C_8$-$C_{20}$ styrene oxides, optionally substituted with one or more halogen atoms or with one or more alkoxy, alkyl or aryl groups.

3. Process for preparing polycarbonate according to claim 1, wherein said epoxy compound is selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorhydrin, epichlorohydrin, epibromidrine, iso-propyl glycidyl ether, butyl glycidyl ether, tert-butyl glycidyl ether, 2-ethylhexyl glycidyl ether, allyl glycidyl ether, cyclopentene oxide, cyclohexene oxide, cyclooctene oxide, cyclododecene oxide, α-pinene oxide, 2,3-epoxinorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and mixtures thereof.

4. Process for preparing polycarbonate according to claim 1, wherein said process is carried out in the presence of at least one organic solvent selected from the group consisting of aliphatic hydrocarbons; aromatic hydrocarbons; halogenated hydrocarbons; and mixtures thereof; wherein said organic solvent is used in volume ratio with respect to said at least one epoxy compound ranging from 0:100 to 99:1.

5. Process for preparing polycarbonate according to claim 1, wherein said at least one epoxy compound acts as a solvent.

6. Process for preparing polycarbonate according to claim 1, in which:
said catalytic system and said at least one epoxy compound are used in a molar ratio ranging from 1:100 to 1:100000 and/or
said catalyst and said co-catalyst are used in a molar ratio ranging from 100:1 to 1:100.

7. Process for preparing polycarbonate according to claim 1, wherein said process is carried out
at a temperature ranging from 40° C. to 160° C.; and
for a time ranging from 3 hours to 24 hours.

8. The process for preparing polycarbonate according to claim 4, wherein the aliphatic hydrocarbons are selected from the group consisting of pentane, octane, decane, cyclohexane, and mixtures thereof; wherein the aromatic hydrocarbons are selected from the group consisting of benzene, toluene, xylene, and mixtures thereof; and wherein the halogenated hydrocarbons are selected from the group consisting of dichloromethane, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromobenzene, and mixtures thereof.

9. The process for preparing polycarbonate according to claim 6, wherein said catalytic system and said at least one epoxy compound are used in a molar ratio ranging from 1:1000 to 1:10000; and wherein said catalyst and said co-catalyst are used in a molar ratio ranging from 2:1 to 1:2.

10. The process for preparing polycarbonate according to claim 7, wherein said temperature ranges from 40° C. to 160° C.; and wherein said pressure ranges from 2 atm to 60 atm; wherein said time ranges from 3 hours to 24 hours.

11. Process for preparing polycarbonate comprising copolymerizing an epoxy compound and carbon dioxide ($CO_2$) in the presence of a catalytic system comprising:
at least one catalyst selected from complexes of a transition metal having general formula (I):

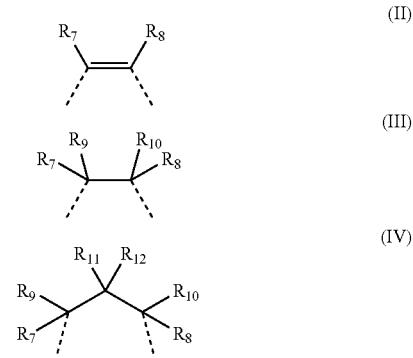

in which:
M represents a metal atom selected from the group consisting of chromium, manganese, iron, cobalt, nickel, and aluminum;
$R_1$, $R_2$, $R_3$, $R_4$, $R_5$ and $R_6$, mutually identical or different, represent a hydrogen atom or are selected, independently, from the group consisting of linear or branched, saturated or unsaturated, $C_1$-$C_{20}$ alkyl groups, optionally including one or more heteroatoms; aryl groups optionally substituted; heteroaryl groups optionally substituted; cycloalkyl groups optionally substituted; and heterocyclic groups optionally substituted;
or $R_2$ and $R_3$ and/or $R_5$ and $R_6$, are linked together so as to form, together with the other atoms to which they are linked, a saturated, unsaturated, or aromatic cycle including from 2 to 12 carbon atoms, optionally substituted with linear or branched, saturated or unsaturated, C1-C20 alkyl groups, optionally including one or more heteroatoms, aryl groups optionally substituted, heteroaryl groups cycloalkyl groups optionally substituted, heterocyclic groups optionally substituted, trialkyl-or triaryl-silyl groups, dialkyl or diaryl-amino groups, dialkyl-or diaryl-phosphino groups, linear or branched, saturated or unsaturated, $C_1$-$C_{20}$ alkoxy groups, aryloxy groups optionally substituted, thioalkoxy or thioaryloxy groups optionally substituted, cyano groups, wherein said cycle optionally includes heteroatoms;
Y represents a halide anion or is selected from the group consisting of inorganic anions and organic anions;
Z represents a divalent organic radical having general formula (II), (III) or (IV):

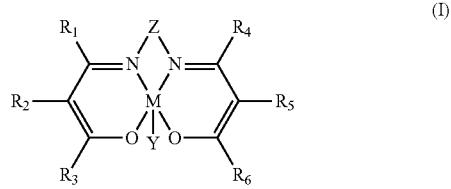

in which:
$R_7$, $R_8$, $R_9$, $R_{10}$, $R_{11}$ and $R_{12}$, mutually identical or different, represent a hydrogen atom or are selected, independently, from saturated or unsaturated, $C_1$-$C_{20}$ alkyl groups, optionally including heteroatoms; aryl groups optionally substituted; heteroaryl groups optionally substituted; cycloalkyl groups optionally substituted; and heterocyclic groups optionally substituted;
or $R_7$ and $R_8$ in the general formula (II), or $R_7$ and $R_{10}$ or $R_8$ and $R_9$ or $R_9$ and $R_{10}$ in the general formula (III), or $R_7$ and $R_{11}$ or $R_7$ and $R_{12}$ or $R_{10}$ and $R_{12}$ or $R_{11}$ and $R_{10}$ in the general formula (IV), are optionally linked to each other so as to form, together with the other atoms to which they are bound, a saturated, unsaturated, or aromatic, cycle containing from 2 to 12 carbon atoms, optionally substituted with linear or branched, saturated or unsaturated $C_1$-$C_{20}$ alkyl groups, optionally including one or more heteroatoms; aryl groups optionally substituted; heteroaryl groups optionally substituted; cycloalkyl groups optionally substituted; heterocyclic groups optionally substituted; trialkyl-or triaryl-silyl groups; dialkyl-or diaryl-amino groups; dialkyl or diaryl-phosphine groups; linear or branched, saturated or unsaturated, $C_1$-$C_{20}$ alkoxy groups; aryloxy groups optionally substituted; thioalkoxy or thioaryloxy groups optionally substituted; and cyano groups, wherein said cycle optionally includes one or more heteroatoms;

at least one co-catalyst selected from ionic compounds having general formula (V):

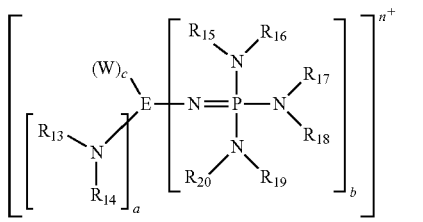

in which:
E represents an atom selected from the group consisting of phosphorus, arsenic, antimony, and bismuth;
$R_{13}$, $R_{14}$, $R_{15}$, $R_{16}$, $R_{17}$, $R_{18}$, $R_{19}$ and $R_{20}$, mutually identical or different, represent a hydrogen atom; or are selected from the group consisting of saturated or unsaturated, $C_1$-$C_{20}$ alkyl groups, optionally including one or more heteroatoms; aryl groups optionally substituted; heteroaryl groups optionally substituted and optionally in cationic form; cycloalkyl groups optionally substituted; heterocyclic groups optionally substituted and optionally in cationic form and trialkyl-or triaryl-silyl groups;
or $R_{13}$ and $R_{14}$, and/or $R_{15}$ and $R_{16}$, and/or $R_{17}$ and $R_{18}$, and/or $R_{19}$ e $R_{20}$, are optionally linked together so as to form, together with the other atoms to which they are linked, a saturated, unsaturated, or aromatic cycle including from 2 to 12 carbon atoms, optionally substituted with linear or branched, saturated or unsaturated, $C_1$-$C_{20}$ alkyl groups, optionally including heteroatoms; aryl groups optionally substituted; heteroaryl groups optionally substituted;-cycloalkyl groups optionally substituted; heterocyclic groups optionally substituted; trialkyl-or triaryl-silyl groups; dialkyl-or diaryl-amino groups; dialkyl-or diaryl-phosphino groups; linear or branched, saturated or unsaturated, C1-C20 alkoxy groups; aryloxy groups optionally substituted; thioalkoxy or thioaryloxy groups optionally substituted; and cyano groups, wherein said cycle optionally includes one or more heteroatoms;
W represents a halogen or is selected from the group consisting of linear or branched, saturated or unsaturated, $C_1$-$C_{20}$ alkoxy groups; aryloxy groups optionally substituted;
and oxylamine groups;
$X^-$ represents a halide anion or it is selected from the group consisting of inorganic anions; organic anions; or tetraalkylborate anions optionally including one or more heteroatoms; tetraarylborate anions optionally including one or more heteroatoms;
a is an integer ranging from 0 to 4;
b is an integer ranging from 0 to 4;
c is 0 or 1;
provided that the sum a+b+c is equal to 4 and that at least one between a and b is different from 0;
n is an integer ranging from 1 to 4,
wherein said process results in a mixture comprising
(a) at least one polycarbonate comprising a quantity of carbonate bonds in chain greater than 95%, and
(b) at least one polycarbonate/polyether copolymer having a quantity of ether bonds in chain ranging from 15% to 90% wherein said weight ratio (a):(b) ranges from 1000:1 to 1:1000.

12. Process for preparing polycarbonate comprising copolymerizing an epoxy compound and carbon dioxide ($CO_2$) in the presence of a catalytic system comprising:
at least one catalyst selected from complexes of a transition metal having general formula (I):

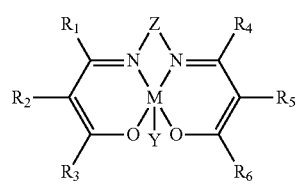

in which:
M represents a metal atom selected from the group consisting of chromium, manganese, iron, cobalt, nickel, and aluminum
$R_1$, $R_2$, $R_3$, $R_4$, $R_5$ and $R_6$, mutually identical or different, represent a hydrogen atom or are selected, independently, from the group consisting of linear or branched, saturated or unsaturated, $C_1$-$C_{20}$ alkyl groups, optionally including one or more heteroatoms; aryl groups optionally substituted; heteroaryl groups optionally substituted; cycloalkyl groups optionally substituted; and heterocyclic groups optionally substituted;
or $R_2$ and $R_3$ and/or $R_5$ and $R_6$, are linked together so as to form, together with the other atoms to which they are linked, a saturated, unsaturated, or aromatic cycle including from 2 to 12 carbon atoms, optionally substituted with linear or branched, saturated or unsaturated, $C_1$-$C_{20}$ alkyl groups, optionally including one or more heteroatoms, aryl groups optionally substituted, heteroaryl groups cycloalkyl groups optionally substituted, heterocyclic groups optionally substituted, trialkyl-or triaryl-silyl groups, dialkyl or diaryl-amino groups, dialkyl-or diaryl-phosphino groups, linear or branched, saturated or unsaturated, $C_1$-$C_{20}$ alkoxy groups, aryloxy groups optionally substituted, thioalkoxy or thioaryloxy groups optionally substituted, cyano groups, wherein said cycle optionally includes heteroatoms;
Y represents a halide anion or is selected from the group consisting of inorganic anions and organic anions;
Z represents a divalent organic radical having general formula (II), (III) or (IV):

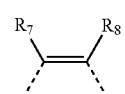

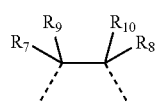

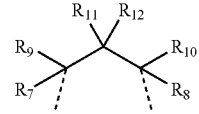

in which:
- $R_7$, $R_8$, $R_9$, $R_{10}$, $R_{11}$ and $R_{12}$, mutually identical or different, represent a hydrogen atom or are selected, independently, from saturated or unsaturated, $C_1$-$C_{20}$ alkyl groups, optionally including heteroatoms; aryl groups optionally substituted; heteroaryl groups optionally substituted; cycloalkyl groups optionally substituted; and heterocyclic groups optionally substituted;
- or Rz and Ra in the general formula (II), or $R_7$ and $R_{10}$ or $R_8$ and $R_9$ or $R_9$ and $R_{10}$ in the general formula (III), or $R_7$ and $R_{11}$ or $R_7$ and $R_{12}$ or $R_{10}$ and $R_{12}$ or $R_{10}$ and $R_{10}$ in the general formula (IV), are optionally linked to each other so as to form, together with the other atoms to which they are bound, a saturated, unsaturated, or aromatic, cycle containing from 2 to 12 carbon atoms, optionally substituted with linear or branched, saturated or unsaturated $C_1$-$C_{20}$ alkyl groups, optionally including one or more heteroatoms; aryl groups optionally substituted; heteroaryl groups optionally substituted; cycloalkyl groups optionally substituted; heterocyclic groups optionally substituted; trialkyl-or triaryl-silyl groups; dialkyl-or diaryl-amino groups; dialkyl or diaryl-phosphine groups; linear or branched, saturated or unsaturated, $C_1$-$C_{20}$ alkoxy groups; aryloxy groups optionally substituted; thioalkoxy or thioaryloxy groups optionally substituted; and cyano groups, wherein said cycle optionally includes one or more heteroatoms;
- at least one co-catalyst selected from ionic compounds having general formula (V):

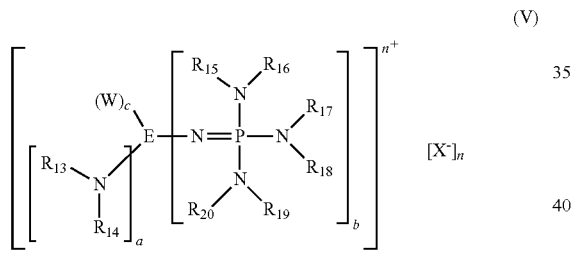

(V)

in which:
- E represents an atom selected from the group consisting of phosphorus, arsenic, antimony, and bismuth;
- $R_{13}$, $R_{14}$, $R_{15}$, $R_{16}$, $R_{17}$, $R_{18}$, $R_{19}$ and $R_{20}$, mutually identical or different, represent a hydrogen atom; or are selected from the group consisting of saturated or unsaturated, $C_1$-$C_{20}$ alkyl groups, optionally including one or more heteroatoms; aryl groups optionally substituted; heteroaryl groups optionally substituted and optionally in cationic form;
- cycloalkyl groups optionally substituted; heterocyclic groups optionally substituted and optionally in cationic form and trialkyl-or triaryl-silyl groups;
- or $R_{13}$ and $R_{14}$, and/or $R_{15}$ and $R_{16}$, and/or $R_{17}$ and $R_{18}$, and/or $R_{19}$ e $R_{20}$, are optionally linked together so as to form, together with the other atoms to which they are linked, a saturated, unsaturated, or aromatic cycle including from 2 to 12 carbon atoms, optionally substituted with linear or branched, saturated or unsaturated, $C_1$-$C_{20}$ alkyl groups, optionally including heteroatoms; aryl groups optionally substituted; heteroaryl groups optionally substituted;-cycloalkyl groups optionally substituted; heterocyclic groups optionally substituted; trialkyl-or triaryl-silyl groups; dialkyl-or diaryl-amino groups; dialkyl-or diaryl-phosphino groups; linear or branched, saturated or unsaturated, $C_1$-$C_{20}$ alkoxy groups; aryloxy groups optionally substituted; thioalkoxy or thioaryloxy groups optionally substituted; and cyano groups, wherein said cycle optionally includes one or more heteroatoms;
- W represents a halogen or is selected from the group consisting of linear or branched, saturated or unsaturated, $C_1$-$C_{20}$ alkoxy groups; aryloxy groups optionally substituted;
- and oxylamine groups;
- X-represents a halide anion or it is selected from the group consisting of inorganic anions; organic anions; or tetraalkylborate anions optionally including one or more heteroatoms; tetraarylborate anions optionally including one or more heteroatoms;
- a is an integer ranging from 0 to 4;
- b is an integer ranging from 0 to 4;
- c is 0 or 1;
- provided that the sum a+b+c is equal to 4 and that at least one between a and b is different from 0;
- n is an integer ranging from 1 to 4,
- wherein said process results in a mixture comprising (a) and (b) wherein (a) is at least one polycarbonate having a quantity of carbonate bonds in its chain greater than 99%; wherein (b) is at least one polycarbonate/polyether copolymer having a quantity of ether bonds in its chain ranging from 35% to 85%; and the weight ratio of (a): (b) ranges from 100:1 to 1:100.

* * * * *